(12) United States Patent
Heijnen

(10) Patent No.: US 11,171,988 B2
(45) Date of Patent: Nov. 9, 2021

(54) SECURE COMMUNICATION SYSTEM AND METHOD FOR TRANSMISSION OF MESSAGES

(71) Applicant: ABN AMRO BANK N.V., Amsterdam (NL)

(72) Inventor: Bert Heijnen, Amsterdam (NL)

(73) Assignee: ABN AMRO BANK N.V., Amsterdam (NL)

(*) Notice: Subject to any disclaimer, the term of this patent is extended or adjusted under 35 U.S.C. 154(b) by 33 days.

(21) Appl. No.: 16/755,282

(22) PCT Filed: Oct. 15, 2018

(86) PCT No.: PCT/NL2018/050675
§ 371 (c)(1),
(2) Date: Apr. 10, 2020

(87) PCT Pub. No.: WO2019/078708
PCT Pub. Date: Apr. 25, 2019

(65) Prior Publication Data
US 2020/0322381 A1 Oct. 8, 2020

(30) Foreign Application Priority Data
Oct. 16, 2017 (NL) ..................................... 2019735

(51) Int. Cl.
*H04L 29/06* (2006.01)
*H04L 9/14* (2006.01)
(52) U.S. Cl.
CPC .............. *H04L 63/166* (2013.01); *H04L 9/14* (2013.01); *H04L 63/0464* (2013.01)

(58) Field of Classification Search
CPC ... H04L 12/16; H04L 63/0428; H04L 63/105; H04L 63/0464; H04L 63/166;
(Continued)

(56) References Cited

U.S. PATENT DOCUMENTS

2001/0055396 A1* 12/2001 Jevans ................ H04L 63/0471
380/282
2004/0236946 A1* 11/2004 Biggs ........................ H04L 9/12
713/166
(Continued)

FOREIGN PATENT DOCUMENTS

GB 2329308 A * 3/1999 ............. H04L 9/088

OTHER PUBLICATIONS

International Search Report dated Feb. 13, 2019, corresponding to Application No. PCT/NL2018/050675.
(Continued)

*Primary Examiner* — Saleh Najjar
*Assistant Examiner* — Khalid M Almaghayreh
(74) *Attorney, Agent, or Firm* — Patterson & Sheridan, L.L.P.

(57) ABSTRACT

In a secure communication system and method, a message is transmitted between a first user device and a second user device through a first routing device, a first connection server, the first routing device, a second routing device, a second connection server, and the second routing device. At the first user device, the message is encrypted at three levels. At the first routing device and the second routing device, the message is decrypted at the third and second levels, and encrypted at new second and third levels. At the first connection server and the second connection server, the message is decrypted at the third, second and first levels, and encrypted at new first, second and third levels. At the second user device, the message is decrypted at the third, second and first levels to retrieve the original message.

22 Claims, 12 Drawing Sheets

(58) Field of Classification Search
CPC ....... H04L 9/0825; H04L 9/0822; H04L 9/00; H04L 9/14; H04L 2209/80; H04L 9/12; H04W 12/068
See application file for complete search history.

(56) References Cited

U.S. PATENT DOCUMENTS

| | | | | | |
|---|---|---|---|---|---|
| 2005/0198170 | A1* | 9/2005 | LeMay | ................. | H04L 63/045 709/206 |
| 2006/0101273 | A1* | 5/2006 | Tan | ..................... | H04L 63/0428 713/182 |
| 2007/0043940 | A1* | 2/2007 | Gustave | ............. | H04W 12/037 713/150 |
| 2009/0307484 | A1* | 12/2009 | Zhang | .................. | H04W 12/03 713/153 |
| 2011/0022835 | A1* | 1/2011 | Schibuk | .............. | G06Q 20/382 713/153 |
| 2011/0051931 | A1* | 3/2011 | Farrugia | ............. | H04L 63/0464 380/255 |
| 2011/0075845 | A1* | 3/2011 | Calcev | .................. | H04L 63/045 380/278 |
| 2011/0113254 | A1* | 5/2011 | Livesey | ................ | H04L 9/0656 713/176 |
| 2013/0091353 | A1* | 4/2013 | Zhang | .................. | H04L 9/3268 713/156 |
| 2015/0349953 | A1* | 12/2015 | Kruglick | ............... | H04L 63/061 713/171 |
| 2015/0379295 | A1* | 12/2015 | Branton | .............. | G06F 21/6218 713/165 |
| 2016/0241523 | A1* | 8/2016 | Ahn | .................... | H04L 63/0428 |
| 2016/0248590 | A1* | 8/2016 | Benson | ................ | G06Q 20/382 |
| 2017/0171219 | A1* | 6/2017 | Campagna | ............ | H04L 9/0841 |
| 2018/0159833 | A1* | 6/2018 | Zhang | .................... | H04L 29/06 |

OTHER PUBLICATIONS

Netherlands Search Report dated Jun. 26, 2018, corresponding to Application No. 2019735.

* cited by examiner

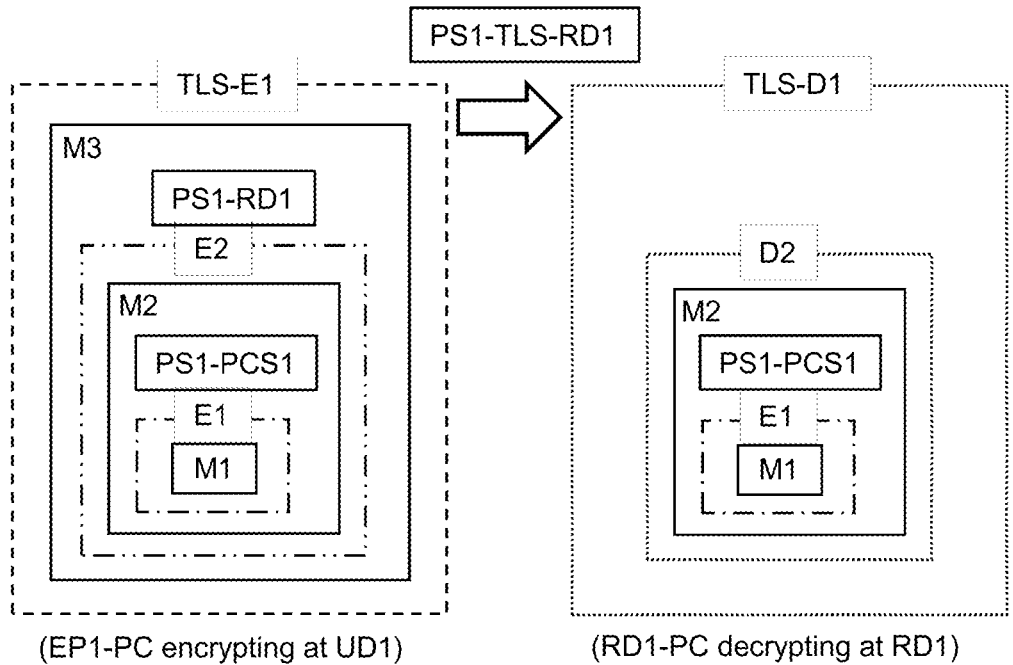
FIG. 2 (EP1-PC encrypting at UD1)
FIG. 3 (RD1-PC decrypting at RD1)
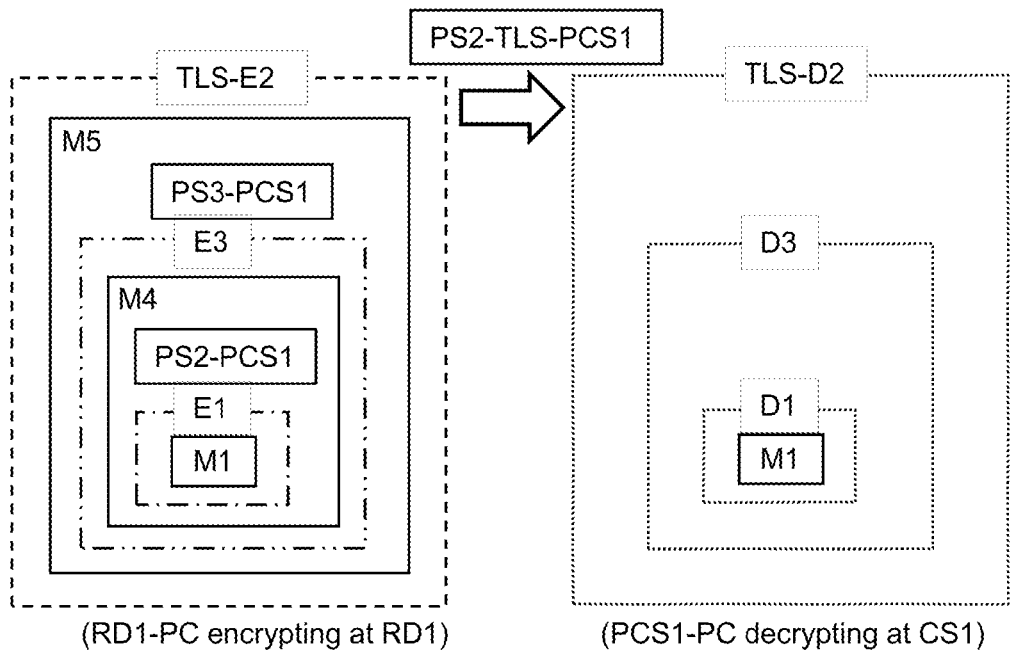
FIG. 4 (RD1-PC encrypting at RD1)
FIG. 5 (PCS1-PC decrypting at CS1)

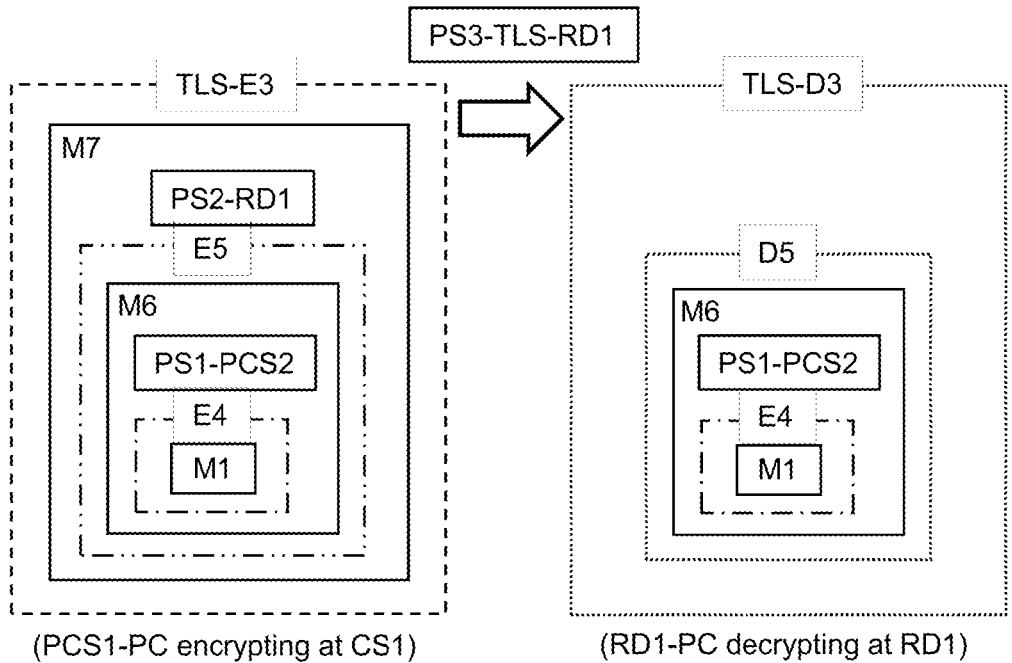
FIG. 6    FIG. 7
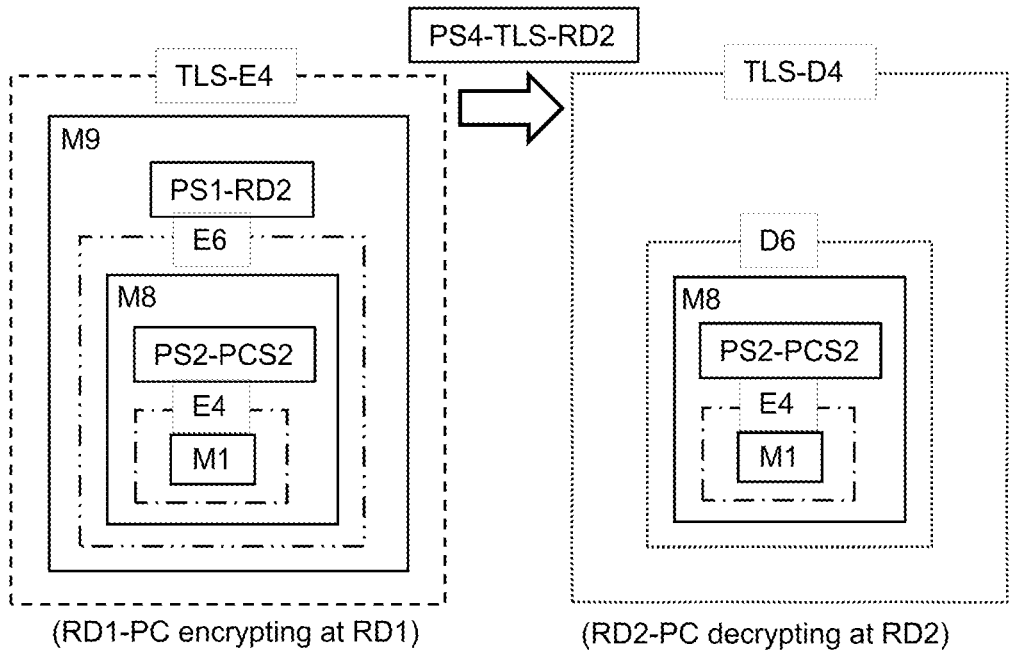
FIG. 8    FIG. 9

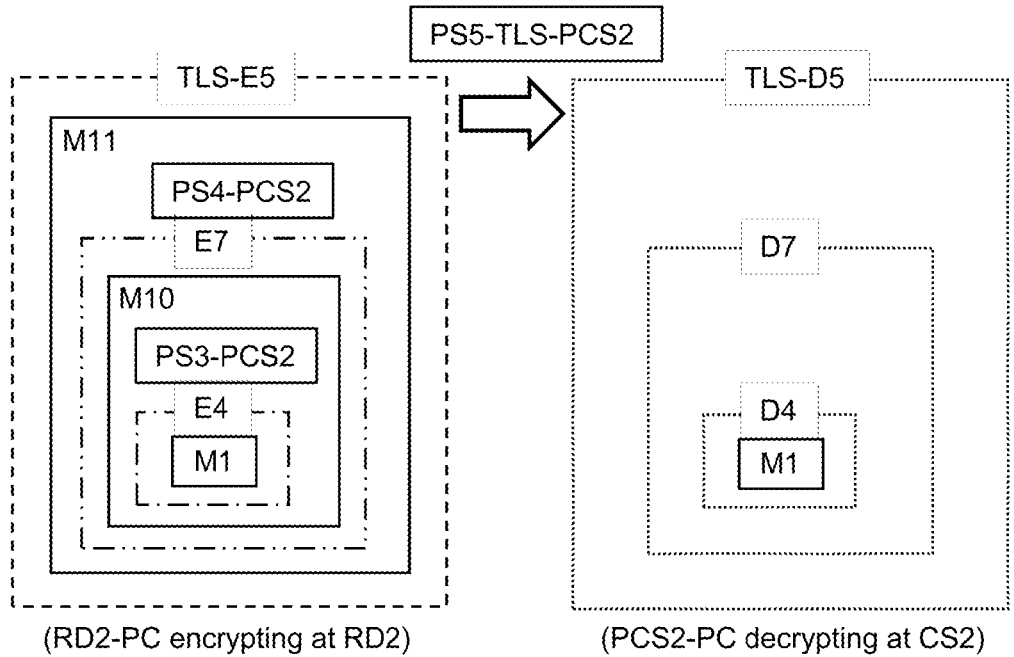
FIG. 10      FIG. 11
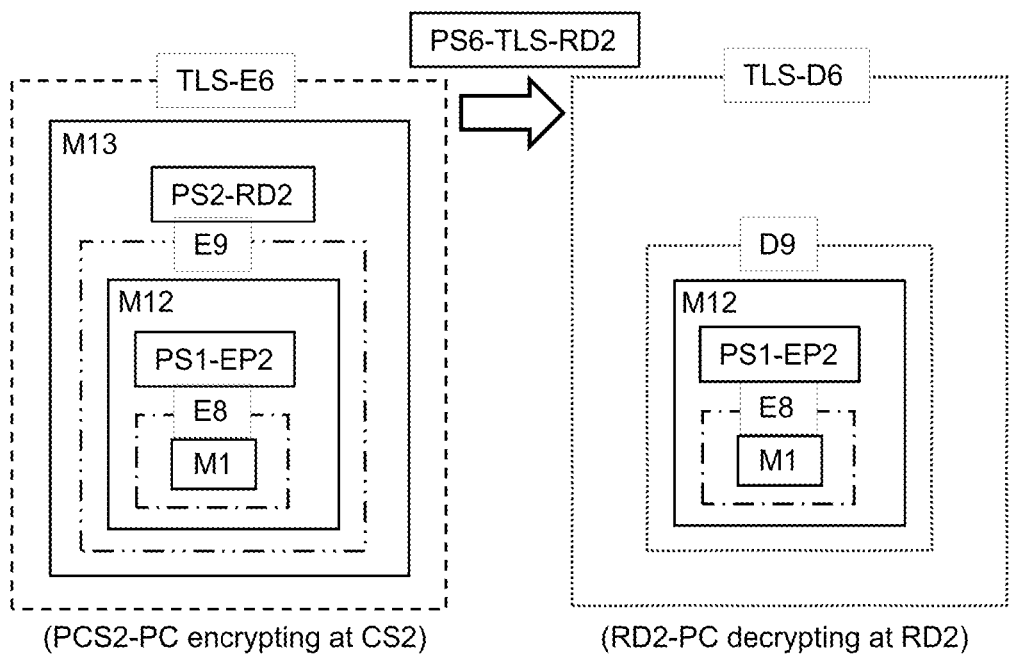
FIG. 12      FIG. 13

SECURE COMMUNICATION SYSTEM AND METHOD FOR TRANSMISSION OF MESSAGES

FIELD OF THE INVENTION

The invention relates to the field of electronic and digital communication, and more specifically to a computer-implemented secure communication system and method for secure and non-reputable communication in the transmission of messages. Here, a message is to be taken as content data to be sent between user devices, that is, between a sender and a receiver, or sending party and receiving party, each associated with a device for sending and receiving a message, respectively. A message may comprise any digital or digitized data, such as texts, files, images, speech, spreadsheets, transaction data, etc.

BACKGROUND OF THE INVENTION

When considering the history of digital processing development, lots of processes within organizations have been automated to improve speed and/or quality. Along with automation, outsourcing has evolved with similar objectives in mind. Technical standards at the time were not available to reach the desired end state. At the time, acceptable solutions were applied to contemporary problems.

To facilitate aftersales, individuals were assigned means to identify themselves in transaction processes. Technical solutions differed between the digital processes to participate in this aftersales. Individuals needed to be identified here, because the company is already known. Userid's, passwords, cards, fingerprints, etc., or combinations were used for identification. Administrations were built to maintain insights in the assignments of the credentials. The result was, and still is, a multitude of identification techniques.

Recent history has learned that these data collections cannot effectively be safeguarded from hacking or leaking information. State of art today is bad practice tomorrow. Centralized solutions tend to be broken by for example hacking, leaking, mistakes, denial of service and/or identity theft. In attempts to counter these effects ever more information is gathered to identify individuals, sometimes without their knowledge, leading to even larger data collections.

Information security best practices appear to stand in the way improving user experience. With ongoing digitization of society and the increasing abuse accompanied with current solutions, a new way of looking at identification and data sharing must be found.

As transaction processing parties, banks are increasingly collecting information with help of their customers. These collections provide insights and could be used to reduce processing costs of companies. Non-banks and individuals are looking at these data collections as sources for extended (ab)use. Legislation evolves to both open these collections to companies and safeguard individuals from abuse by these same companies.

To overcome negative effects and resulting bad reputation of faults/failures in protecting information, companies just change their name or appearances when they abuse or are abused. Individuals however are victimized by this trend because they are the ones about whom the data is collected. They have to protect this data with tokens (passwords, etc.). In this respect, it is noted that fingerprints, retina scans, etc., cannot change.

Both individuals and companies desire a better solution for addressing recognition of each other, preventing abuse by third parties as well as meeting expectations concerning ease of use, privacy and control. It is desired to make communications irrefutable and non-interceptable to pave the way for vetting identities of both individuals and companies without storing information in the solution itself. Current solutions combine identity tokens and identity information, making them vulnerable to abuse.

Thus, an independency of the transported information from the communication method is needed. Abuse cannot be performed when information is not available.

Several attempts have been made to improve protection of information. Reference US 2009/0307484 A1 relates to wireless access point security for multi-hop networks, and discloses an enhancement in wireless communication networks that employ relay stations to facilitate communications between base stations and mobile stations. Resource information provided to one or more relay stations from a base station or another relay station is encrypted prior to being delivered to the one or more relay stations. Only authorized relay stations are allocated an appropriate key necessary to decrypt the resource information. As such, only appropriate relay stations are able to access and use the resource information to effect communications directly or indirectly between the base stations and the mobile stations. End-to-end security may be enhanced by providing a per-hop additional layer of security by applying a further encryption of first encrypted traffic content transmitted from a base station to a relay station, or between relay stations.

A disadvantage of the method according to said reference is that, as not all hops are part of the path of communication, possibilities are available to become a Man-in-the-Middle through rerouting the path before or after it enters the authorized relay station network. A further disadvantage is that the individual does not have a clue how to identify an authorized relay station network and all the connections between the different authorized relay stations.

Furthermore, in the transmission of information, a complete path of transmission must be secured to prevent Man-in-the-Middle attacks. Contrary to the teaching of said reference, the communication must not depend on specific hardware to allow any individual to securely communicate with any company.

There still exists a need to further enhance the security of information transmission, in particular to enhance the mutual identification of the communicating parties, and to provide a proof of correctness of the exchanged information.

In particular, it is desirable to separate content and secure (d) transport from each other, to provide a proof of trust.

SUMMARY OF THE INVENTION

It would be desirable to provide an improved, or at least an alternative system and method for secure and trusted transmission of messages.

To better address this concern, in a first aspect of the invention a secure communication system for transmission of messages is provided. The system comprises:
a first pillar system, comprising:
  a first user device, UD1, comprising at least one first endpoint, EP1, processing component configured for encrypting and routing a message;
  a first routing device, RD1, comprising an RD1 processing component configured for encrypting, decrypting and routing a message; and a first connection server, CS1, comprising at least one first personal connection server, PCS1, processing component configured for encrypting, decrypting and routing a message; and a second pillar system, comprising:

a second user device, UD2, comprising at least one second endpoint, EP2, processing component configured for decrypting a message;

a second routing device, RD2, comprising an RD2 processing component configured for encrypting, decrypting and routing a message;

a second connection server, CS2, comprising at least one second personal connection server, PCS2, processing component configured for encrypting, decrypting and routing a message;

wherein the system is configured for transmitting a first message from the EP1 processing component to the EP2 processing component by:

in the first pillar system:

at the UD1, the EP1 processing component encrypting the first message at a first level and at a second level, and encrypting the first message at a third level based on a transport layer security, TLS, protocol;

transmitting the three times encrypted first message from the UD1 to the RD1 via secure transmission;

at the RD1, the RD1 processing component decrypting the first message at the third level based on the TLS protocol, decrypting the first message at the second level, encrypting the first message at a new second level, and encrypting the first message at a new third level based on the TLS protocol;

transmitting the three times encrypted first message from the RD1 to the CS1 via secure transmission;

at the CS1, the PCS1 processing component decrypting the first message at the third level based on the TLS protocol, decrypting the first message at the second level and at the first level, encrypting the first message at a new first level and at a new second level, and encrypting the first message at a new third level based on the TLS protocol;

transmitting the three times encrypted first message from the CS1 to the RD1 via secure transmission;

at the RD1, the RD1 processing component decrypting the first message at the third level based on the TLS protocol, decrypting the first message at the second level, encrypting the first message at a new second level, and encrypting the first message at a new third level based on the TLS protocol;

transmitting the three times encrypted first message from the first pillar system to the second pillar system by transmitting the three times encrypted first message from the RD1 to the RD2 via secure transmission;

in the second pillar system:

at the RD2, the RD2 processing component decrypting the first message at the third level based on the TLS protocol, decrypting the first message at the second level, encrypting the first message at a new second level, and encrypting the first message at a new third level based on the TLS protocol;

transmitting the three times encrypted first message from the RD2 to the CS2 via secure transmission;

at the CS2, the PCS2 processing component decrypting the first message at the third level based on the TLS protocol, decrypting the first message at the second level and at the first level, encrypting the first message at a new first level and at a new second level, and encrypting the first message at a new third level based on the TLS protocol;

transmitting the three times encrypted first message from the CS2 to the RD2 via secure transmission;

at the RD2, the RD2 processing component decrypting the first message at the third level based on the TLS protocol, decrypting the first message at the second level, encrypting the first message at a new second level, and encrypting the first message at a new third level based on the TLS protocol;

transmitting the three times encrypted first message from the RD2 to the UD2 via secure transmission; and at the UD2, the EP2 processing component decrypting the first message at the third level based on the TLS protocol, and decrypting the first message at the second level and at the first level.

Herein, a processing component (UD, RD, PCS) may comprise hardware, in particular at least one processor, and dedicated software for performing the associated function, wherein the software comprises computer instructions which, when loaded into the at least one processor, cause the processor to perform the function.

In a secure transmission of a message from one entity to another, the message is encrypted at a third level, using the transport layer security, TLS, protocol. Accordingly, during any transmission, the first message is being encrypted at a first, second and third level of encryption. Accordingly, in each encrypting step, after the first message is encrypted at a second level, the first message is encrypted at a third level based on the TLS protocol. After transmission, in each decrypting step, before the first message is decrypted at the second level, the first message is decrypted at the third level based on the TLS protocol.

In order to enable communicating parties to communicate with known parties, only secured paths to these parties are allowed. Predictability of the communication path, and ignorance about the encryption/decryption steps is paramount to mitigate any possibility of eavesdropping and Man in the Middle, MitM, attack attempts.

The system of the present invention is based on what is defined as pillar systems herein, each pillar system comprising a user device, UD, routing device, RD and connection server, CS, and their respective endpoint, EP, routing device, RD, and personal connection server, PCS, processing components. In each pillar system, a one-to-one relationship between a UD, RD and CS and their respective EP, RD and PCS processing components is established by distributing first and second level encryption and decryption keys, and TLS keys and certificates for third level encryption, and relevant pseudonyms to enable the respective EP, RD and PCS processing components to identify the keys stored at the respective UD, RD and CS, and perform the encryption, secure transmission, and decryption there.

There is only one moment at which a complete communication path between EPs of different pillar systems is known, that is, upon assignment of keys and pseudonyms. After storage of keys and pseudonyms, the communication path cannot be discovered any more.

In a pillar system, a message can be transmitted from the UD via the RD to the CS, and vice versa.

One UD may comprise one or more EP processing components, communicating with one or more RDs. One EP processing component is allowed to communicate with only one RD. One RD may communicate with one or more EP processing components of one or more UDs. One CS may comprise one or more PCS processing components, and is allowed to communicate with only one RD. One EP processing component of one pillar system may communicate with only one PCS component of the same pillar system, while one PCS processing component of one pillar system may communicate with one or more EP processing components and one or more PCS processing components of other pillar systems.

Different pillar systems may communicate with each other via their respective RDs. Thus, a UD1 of a first pillar communicates with a UD2 of a second pillar by connecting the RD1 of the first pillar associated with the UD1 to the RD2 of the second pillar associated with the UD2. Then, a message flow may be in a communication chain from UD1 to RD1, from RD1 to CS1, from CS1 back to RD1, from RD1 to RD2, from RD2 to CS2, from CS2 back to RD2, and from RD2 to UD2. The message flow may also be in reverse direction, from UD2 to UD1.

In the system, connections are mutually authenticated before they are used for sending messages. The system provides non-reputable communication and it is based on trust on first use, TOFU. TOFU is used to prepare connections and personalized keys within a pillar system. TOFU is also used to prepare a connection between two pillars with its own set of personalized keys. For every hop (step from one entity to another entity), a new set of keys and pseudonyms is used which are only known by these two entities. Furthermore, if one processing component, PC, (of a UD, RD, CS) were to be removed from a communication chain, the whole communication chain fails.

There is no identification required to trust the connection, and the connection may be sustained until one of either EPs disconnects. A connection of two pillars can only be performed when one pillar prepares for the connection of the other pillar, i.e., based on TOFU, when the other pillar expects the one pillar to connect.

In an embodiment, the secure communication system is further configured for transmitting the first message from the EP1 processing component to the EP2 processing component by:

at the UD1, the EP1 processing component encrypting the first message at the first level of encryption, associating the encrypted first message with a unique first PCS1 pseudonym to form a second message, encrypting the second message at the second level of encryption, associating the encrypted second message with a unique first RD1 pseudonym to form a third message, encrypting the third message at the third level of encryption, and associating the encrypted third message with a unique first TLS pseudonym for transmission to the RD1;

transmitting the encrypted third message from the UD1 to the RD1;

at the RD1, the RD1 processing component decrypting the third level of encryption of the encrypted third message based on the first TLS pseudonym, and decrypting the second level of encryption of the encrypted second message based on the first RD1 pseudonym as indicated by the first TLS pseudonym;

at the RD1, the RD1 processing component associating the encrypted first message with a second PCS1 pseudonym as indicated by the first PCS1 pseudonym to form a fourth message, encrypting the fourth message at the second level of encryption, associating the encrypted fourth message with a unique third PCS1 pseudonym to form a fifth message, encrypting the fifth message at the third level of encryption, and associating the encrypted fifth message with a unique second TLS pseudonym for transmission to the CS1;

transmitting the encrypted fifth message from the RD1 to the CS1;

at the CS1, the PCS1 processing component decrypting the third level of encryption of the encrypted fifth message based on the second TLS pseudonym, decrypting the second level of encryption of the encrypted fourth message based on the third PCS1 pseudonym as indicated by the second TLS pseudonym, and decrypting the first level of encryption of the encrypted first message based on the second PCS1 pseudonym as indicated by the third PCS1 pseudonym;

at the CS1, the PCS1 processing component encrypting the first message at the first level of encryption, associating the encrypted first message with a unique first PCS2 pseudonym to form a sixth message, encrypting the sixth message at the second level of encryption, associating the encrypted sixth message with a unique second RD1 pseudonym to form a seventh message, encrypting the seventh message at the third level of encryption, and associating the encrypted seventh message with a unique third TLS pseudonym for transmission to the RD1;

transmitting the encrypted seventh message from the CS1 to the RD1;

at the RD1, the RD1 processing component decrypting the third level of encryption of the encrypted seventh message based on the third TLS pseudonym, and decrypting the second level of encryption of the encrypted sixth message based on the second RD1 pseudonym as indicated by the third TLS pseudonym;

at the RD1, the RD1 processing component associating the encrypted first message with a second PCS2 pseudonym as indicated by the first PCS2 pseudonym to form an eighth message, encrypting the eighth message at the second level of encryption, associating the encrypted eighth message with a unique first RD2 pseudonym to form a ninth message, encrypting the ninth message at the third level of encryption, and associating the encrypted ninth message with a unique fourth TLS pseudonym for transmission to the RD2;

transmitting the encrypted ninth message from the RD1 to the RD2;

at the RD2, the RD2 processing component decrypting the third level of encryption of the encrypted ninth message based on the fourth TLS pseudonym, and decrypting the second level of encryption of the encrypted eighth message based on the first RD2 pseudonym as indicated by the fourth TLS pseudonym;

at the RD2, the RD2 processing component associating the encrypted first message with a third PCS2 pseudonym as indicated by the second PCS2 pseudonym to form a tenth message, encrypting the tenth message at the second level of encryption, associating the encrypted tenth message with a unique second PCS2 pseudonym to form an eleventh message, encrypting the eleventh message at the third level of encryption, and associating the encrypted eleventh message with a unique fifth TLS pseudonym for transmission to the CS2;

transmitting the encrypted eleventh message from the RD2 to the CS2;

at the CS2, the PCS2 processing component decrypting the third level of encryption of the encrypted eleventh message based on the fifth TLS pseudonym, decrypting the second level of encryption of the encrypted tenth message based on the fourth PCS2 pseudonym as indicated by the fifth TLS pseudonym, and decrypting the first level of encryption of the encrypted first message based on the third PCS2 pseudonym as indicated by the fourth PCS2 pseudonym;

at the CS2, the PCS2 processing component encrypting the first message at the first level of encryption, associating the first message with a unique first EP2 pseudonym to form a twelfth message, encrypting the twelfth message at the second level of encryption, associating the encrypted twelfth message with a unique second RD2 pseudonym to form a thirteenth message, encrypting the thirteenth message at the third level of encryption, and associating the encrypted thirteenth message with a unique sixth TLS pseudonym for transmission to the RD2;

transmitting the encrypted thirteenth message from the CS2 to the RD2;

at the RD2, the RD2 processing component decrypting the third level of encryption of the encrypted thirteenth message based on the sixth TLS pseudonym, and decrypting the second level of encryption of the encrypted twelfth message based on the second RD2 pseudonym as indicated by the sixth TLS pseudonym;

at the RD2, the RD2 processing component associating the encrypted first message with a second EP2 pseudonym as indicated by the first EP2 pseudonym to form a fourteenth message, encrypting the fourteenth message at the second level of encryption, associating the encrypted fourteenth message with a unique third EP2 pseudonym to form a fifteenth message, encrypting the fifteenth message at the third level of encryption, and associating the encrypted fifteenth message with a unique seventh TLS pseudonym for transmission to the UD2;

transmitting the encrypted fifteenth message from the RD2 to the UD2; and at the UD2, the EP2 processing component decrypting the third level of encryption of the encrypted fifteenth message based on the seventh TLS pseudonym, decrypting the second level of encryption of the encrypted fourteenth message based on the third EP2 pseudonym as indicated by the seventh TLS pseudonym, and decrypting the first level of encryption of the encrypted first message based on the second EP2 pseudonym as indicated by the third EP2 pseudonym.

Herein, the term pseudonym relates to an index or data string which cannot be reduced or converted to another pseudonym, index, data string, key, identity or other characterizing data. In the system and method of the present invention, this ensures anonymity and irreducibility. Each pseudonym is a universally unique identifier, UUID.

The pseudonyms transmitted in the messages from one entity (UD, RD, CS) to another entity enable receiving entities to retrieve specific unique decryption keys for decryption of a second level encryption (RD), or a second level and a first level encryption (CS, UD). The pseudonyms further enable sending entities to retrieve specific unique encryption keys for first level and second level encryption (UD, CS), or second level encryption (RD).

In an embodiment, the secure communication system is further configured for transmitting a first message from the EP1 processing component to the EP2 processing component by:

at the UD1, the EP1 processing component encrypting the first message using an encryption key of a first key pair, generating the second message comprising the encrypted first message, encrypting the second message using an encryption key of a second key pair, generating the third message comprising the encrypted second message, encrypting the third message using an encryption key of a first TLS key pair, and generating the encrypted third message;

transmitting the encrypted third message from the UD1 to the RD1;

at the RD1, the RD1 processing component decrypting the encrypted third message using a decryption key of the first TLS key pair to recover the third message, and decrypting the encrypted second message using a decryption key of the second key pair to recover the second message;

at the RD1, the RD1 processing component encrypting the fourth message using an encryption key of a third key pair, generating the fifth message comprising the encrypted fourth message, encrypting the fifth message using an encryption key of a second TLS key pair, and generating the encrypted fifth message;

transmitting the encrypted fifth message from the RD1 to the CS1;

at the CS1, the PCS1 processing component decrypting the encrypted fifth message using a decryption key of the second TLS key pair to recover the fifth message, decrypting the encrypted fourth message using a decryption key of the third key pair to recover the fourth message, and decrypting the encrypted first message using a decryption key of the first key pair to recover the first message;

at the CS1, the PCS1 processing component encrypting the first message using an encryption key of a fourth key pair, generating the sixth message comprising the once again encrypted first message, encrypting the sixth message using an encryption key of a fifth key pair, generating the seventh message comprising the encrypted sixth message, encrypting the seventh message using an encryption key of a third TLS key pair, and generating the encrypted seventh message;

transmitting the encrypted seventh message from the CS1 to the RD1;

at the RD1, the RD1 processing component decrypting the encrypted seventh message using a decryption key of the third TLS key pair to recover the seventh message, and decrypting the encrypted sixth message using a decryption key of the fifth key pair to recover the sixth message;

at the RD1, the RD1 processing component encrypting the eighth message using an encryption key of a sixth key pair, generating the ninth message comprising the encrypted eighth message, encrypting the ninth message using an encryption key of a fourth TLS key pair, and generating the encrypted ninth message;

transmitting the encrypted ninth message from the RD1 to the RD2;

at the RD2, the RD2 processing component decrypting the encrypted ninth message using a decryption key of the fourth TLS key pair to recover the ninth message, and decrypting the encrypted eighth message using a decryption key of the sixth key pair to recover the eighth message;

at the RD2, the RD2 processing component encrypting the tenth message using an encryption key of a seventh key pair, generating the eleventh message comprising the encrypted tenth message, encrypting the eleventh message using an encryption key of a fifth TLS key pair, and generating the encrypted eleventh message;

transmitting the encrypted eleventh message from the RD2 to the CS2;

at the CS2, the PCS2 processing component decrypting the encrypted eleventh message using a decryption key of the fifth TLS key pair to recover the eleventh message, decrypting the encrypted tenth message using a decryption key of the seventh key pair to recover the tenth message, and decrypting the encrypted first message using a decryption key of the fourth key pair to recover the first message;

at the CS2, the PCS2 processing component encrypting the first message using an encryption key of an eighth key pair, generating the twelfth message comprising the encrypted first message, encrypting the twelfth message using an encryption key of a ninth key pair, generating the thirteenth message comprising the encrypted twelfth message, encrypting the thirteenth message using an encryption key of a sixth TLS key pair, and generating the encrypted thirteenth message;

transmitting the encrypted thirteenth message from the CS2 to the RD2;

at the RD2, the RD2 processing component decrypting the encrypted thirteenth message using a decryption key of the sixth TLS key pair to recover the thirteenth message, decrypting the encrypted twelfth message using a decryption key of the ninth key pair to recover the twelfth message;

at the RD2, the RD2 processing component encrypting the fourteenth message using an encryption key of a tenth key pair, generating the fifteenth message comprising the encrypted fourteenth message, encrypting the fifteenth message using an encryption key of a seventh TLS key pair, and generating the encrypted fifteenth message;

transmitting the encrypted fifteenth message from the RD2 to the UD2; and at the UD2, the EP2 processing component decrypting the encrypted fifteenth message using a decryption key of the seventh TLS key pair to recover the fifteenth message, decrypting the encrypted fourteenth message using a decryption key of the tenth key pair to recover the fourteenth message, and decrypting the encrypted first message using a decryption key of the eighth key pair to recover the first message.

Accordingly, with at least seventeen key pairs, which preferably are asymmetric key pairs, but may also be symmetric key pairs, a transmission of a message is highly secured.

In the embodiment of the secure communication system using seventeen key pairs, the encryption and decryption keys to be used in a communication chain are stored at, or in association with, the respective entities (UD, RD, CS) using storage components, wherein a storage component comprises a physical memory for storing keys, and software for storing and retrieving the keys. More specifically:

the UD1 comprises an EP1 storage component associated with the EP1 processing component, and storing at least the encryption key of the first key pair, the encryption key of the second key pair, and the encryption key of the first TLS key pair, and the EP1 processing component is configured to retrieve the encryption keys from the EP1 storage component;

the UD2 comprises an EP2 storage component associated with the EP2 processing component, and storing at least the decryption key of the seventh TLS key pair, the decryption key of the eighth key pair, and the decryption key of the tenth key pair, and the EP2 processing component is configured to retrieve the decryption keys from the EP2 storage component;

the RD1 comprises an RD1 storage component associated with the RD1 processing component, and storing at least the encryption key of the third key pair, the encryption key of the sixth key pair, the encryption key of the second TLS key pair, the encryption key of the fourth TLS key pair, the decryption key of the first TLS key pair, the decryption key of the third TLS key pair, the decryption key of the second key pair, and the decryption key of the fifth key pair, and the RD1 processing component is configured to retrieve the encryption and decryption keys from the RD1 storage component;

the RD2 comprises an RD2 storage component associated with the RD2 processing component, and storing the encryption key of the seventh key pair, the encryption key of the tenth key pair, the encryption key of the fifth TLS key pair, the encryption key of the seventh TLS key pair, the decryption key of the fourth TLS key pair, the decryption key of the sixth TLS key pair, the decryption key of the sixth key pair, and the decryption key of the ninth key pair, and the RD2 processing component is configured to retrieve the encryption and decryption keys from the RD2 storage component;

the CS1 comprises a PCS1 storage component associated with the PCS1 processing component, and storing the encryption key of the fourth key pair, the encryption key of the fifth key pair, the encryption key of the third TLS key pair, the decryption key of the second TLS key pair, the decryption key of the first key pair, and the decryption key of the third key pair, and the PCS1 processing component is configured to retrieve the encryption and decryption keys from the PCS1 storage component; and the CS2 comprises a PCS2 storage component associated with the PCS2 processing component, and storing the encryption key of the eighth key pair, the encryption key of the ninth key pair, the encryption key of the sixth TLS key pair, the decryption key of the fifth TLS key pair, the decryption key of the fourth key pair, and the decryption key of the seventh key pair, and the PCS2 processing component is configured to retrieve the encryption and decryption keys from the PCS2 storage component.

In embodiments of the secure communication system using seventeen key pairs:

the RD1 processing component further is configured for retrieving the decryption key of the second key pair based on the first RD1 pseudonym in the third message, retrieving the decryption key of the fifth key pair based on the second RD1 pseudonym in the seventh message, retrieving the decryption key of the first TLS key pair based on the first TLS pseudonym, and retrieving the decryption key of the third TLS key pair based on the third TLS pseudonym;

the PCS1 processing component further is configured for retrieving the decryption key of the first key pair based on the second PCS1 pseudonym in the fourth message, retrieving the decryption key of the third key pair based on the third PCS1 pseudonym in the fifth message, and retrieving the decryption key of the second TLS key pair based on the second TLS pseudonym;

the RD2 processing component further is configured for retrieving the decryption key of the sixth key pair based on the first RD2 pseudonym in the ninth message, retrieving the decryption key of the ninth key pair based on the second RD2 pseudonym in the thirteenth message, retrieving the decryption key of the fourth TLS key pair based on the fourth TLS pseudonym, and retrieving the decryption key of the sixth TLS key pair based on the sixth TLS pseudonym;

the PCS2 processing component further is configured for retrieving the decryption key of the fourth key pair based on the third PCS2 pseudonym in the tenth message, retrieving the decryption key of the seventh key pair based on the fourth PCS2 pseudonym in the eleventh message, and retrieving the decryption key of the fifth TLS key pair based on the fifth TLS pseudonym; and/or the EP2 processing component further is configured for retrieving the decryption key of the eighth key pair based on the second EP2 pseudonym in the fourteenth message, retrieving the decryption key of the tenth key pair based on the third EP2 pseudonym in the fifteenth message, and retrieving the decryption key of the seventh TLS key pair based on the seventh TLS pseudonym.

In embodiments of the secure communication system:

the UD1 comprises a plurality of EP1 processing components and/or a plurality of EP1 storage components; and/or the UD2 comprises a plurality of EP2 processing components and/or a plurality of EP2 storage components; and/or the RD1 comprises a plurality of RD1 processing components and/or a plurality of RD1 storage components; and/or the RD2 comprises a plurality of RD2 processing components and/or a plurality of RD2 storage components; and/or the CS1 comprises a plurality of PCS1 processing components and/or a plurality of PCS1 storage components; and/or the CS2 comprises a plurality of PCS2 processing components and/or a plurality of PCS2 storage components.

In an embodiment of the secure communication system, the first message is a Derived Unique Key Per Transaction, DUKPT, encrypted message. The DUKPT encrypted message provides a further enhanced security during transmission of the first message from the UD1 to the UD2.

In an embodiment of the secure communication system, the EP1 processing component further is configured for including an alias in the first message, the alias being for use by the PCS1 processing component for selecting a routing of the first message to the CS2, and being for use by the PCS2 processing component for selecting a routing of the first message to the EP2.

The alias is also a code defining the destination of the message.

In an embodiment of the secure communication system, the UD1, UD2, RD1, RD2, CS1 and CS2 are server devices in a client-server relationship of mutually communicating devices. For a consumer party managing a UD, the EP may be an app on the UD. For a non-consumer party, the UD may be an API server.

In a second aspect, the present invention provides a secure communication method for transmission of a first message between a first user device, UD1, and a second user device, UD2, the method comprising:

at the UD1, encrypting the first message at a first level and at a second level, and encrypting the first message at a third level based on a transport layer security, TLS, protocol;

transmitting the three times encrypted first message from the UD1 to a first routing device, RD1, via secure transmission;

at the RD1, decrypting the first message at the third level based on the TLS protocol, decrypting the first message at the second level, encrypting the first message at a new second level, and encrypting the first message at a new third level based on the TLS protocol;

transmitting the three times encrypted first message from the RD1 to a first connection server, CS1, via secure transmission;

at the CS1, decrypting the first message at the third level based on the TLS protocol, decrypting the first message at the second level and at the first level, encrypting the first message at a new first level and at a new second level, and encrypting the first message at a new third level based on the TLS protocol;

transmitting the three times encrypted first message from the CS1 to the RD1 via secure transmission;

at the RD1, decrypting the first message at the third level based on the TLS protocol, decrypting the first message at the second level, encrypting the first message at a new second level, and encrypting the first message at a new third level based on the TLS protocol;

transmitting the three times encrypted first message from the RD1 to a second routing device, RD2, via secure transmission;

at the RD2, decrypting the first message at the third level based on the TLS protocol, decrypting the first message at the second level, encrypting the first message at a new second level, and encrypting the first message at a new third level based on the TLS protocol;

transmitting the three times encrypted first message from the RD2 to a second connection server, CS2, via secure transmission;

at the CS2, decrypting the first message at the third level based on the TLS protocol, decrypting the first message at the second level and at the first level, encrypting the first message at a new first level and at a new second level, and encrypting the first message at a new third level based on the TLS protocol;

transmitting the three times encrypted first message from the CS2 to the RD2 via secure transmission;

at the RD2, decrypting the first message at the third level based on the TLS protocol, decrypting the first message at the second level, encrypting the first message at a new second level, and encrypting the first message at a new third level based on the TLS protocol;

transmitting the three times encrypted first message from the RD2 to the UD2 via secure transmission; and at the UD2, the decrypting the first message at the third level based on the TLS protocol, and decrypting the first message at the second level and at the first level.

In an embodiment, the secure communication method further comprises:

at the UD1, encrypting the first message at the first level of encryption, associating the encrypted first message with a unique first PCS1 pseudonym to form a second message, encrypting the second message at the second level of encryption, associating the encrypted second message with a unique first RD1 pseudonym to form a third message, encrypting the third message at the third level of encryption, and associating the encrypted third message with a unique first TLS pseudonym for transmission to the RD1;

transmitting the encrypted third message from the UD1 to the RD1;

at the RD1, decrypting the third level of encryption of the encrypted third message based on the first TLS pseudonym, and decrypting the second level of encryption of the encrypted second message based on the first RD1 pseudonym as indicated by the first TLS pseudonym;

at the RD1, associating the encrypted first message with a second PCS1 pseudonym as indicated by the first PCS1 pseudonym to form a fourth message, encrypting the fourth message at the second level of encryption, associating the encrypted fourth message with a unique third PCS1 pseudonym to form a fifth message, encrypting the fifth message at the third level of encryption, and associating the encrypted fifth message with a unique second TLS pseudonym for transmission to the CS1;

transmitting the encrypted fifth message from the RD1 to the CS1;

at the CS1, decrypting the third level of encryption of the encrypted fifth message based on the second TLS pseudonym, decrypting the second level of encryption of the encrypted fourth message based on the third PCS1 pseudonym as indicated by the second TLS pseudonym, and decrypting the first level of encryption of the encrypted first message based on the second PCS1 pseudonym as indicated by the third PCS1 pseudonym;

at the CS1, encrypting the first message at the first level of encryption, associating the encrypted first message with a unique first PCS2 pseudonym to form a sixth message, encrypting the sixth message at the second level of encryption, associating the encrypted sixth message with a unique second RD1 pseudonym to form a seventh message, encrypting the seventh message at the third level of encryption, and associating the encrypted seventh message with a unique third TLS pseudonym for transmission to the RD1;

transmitting the encrypted seventh message from the CS1 to the RD1;

at the RD1, decrypting the third level of encryption of the encrypted seventh message based on the third TLS pseudonym, and decrypting the second level of encryption of the encrypted sixth message based on the second RD1 pseudonym as indicated by the third TLS pseudonym;

at the RD1, associating the encrypted first message with a second PCS2 pseudonym as indicated by the first PCS2 pseudonym to form an eighth message, encrypting the eighth message at the second level of encryption, associating the encrypted eighth message with a unique first RD2 pseudonym to form a ninth message, encrypting the ninth message at the third level of encryption, and associating the encrypted ninth message with a unique fourth TLS pseudonym for transmission to the RD2;

transmitting the encrypted ninth message from the RD1 to the RD2;

at the RD2, decrypting the third level of encryption of the encrypted ninth message based on the fourth TLS pseudonym, and decrypting the second level of encryption of the encrypted eighth message based on the first RD2 pseudonym as indicated by the fourth TLS pseudonym;

at the RD2, associating the encrypted first message with a third PCS2 pseudonym as indicated by the second PCS2 pseudonym to form a tenth message, encrypting the tenth message at the second level of encryption, associating the encrypted tenth message with a unique second PCS2 pseudonym to form an eleventh message, encrypting the eleventh message at the third level of encryption, and associating the encrypted eleventh message with a unique fifth TLS pseudonym for transmission to the CS2;

transmitting the encrypted eleventh message from the RD2 to the CS2;

at the CS2, decrypting the third level of encryption of the encrypted eleventh message based on the fifth TLS pseudonym, decrypting the second level of encryption of the encrypted tenth message based on the fourth PCS2 pseudonym as indicated by the fifth TLS pseudonym, and decrypting the first level of encryption of the encrypted first message based on the third PCS2 pseudonym as indicated by the fourth PCS2 pseudonym;

at the CS2, encrypting the first message at the first level of encryption, associating the first message with a unique first EP2 pseudonym to form a twelfth message, encrypting the twelfth message at the second level of encryption, associating the encrypted twelfth message with a unique second RD2 pseudonym to form a thirteenth message, encrypting the thirteenth message at the third level of encryption, and associating the encrypted thirteenth message with a unique sixth TLS pseudonym for transmission to the RD2;

transmitting the encrypted thirteenth message from the CS2 to the RD2;

at the RD2, decrypting the third level of encryption of the encrypted thirteenth message based on the sixth TLS pseudonym, and decrypting the second level of encryption of the encrypted twelfth message based on the second RD2 pseudonym as indicated by the sixth TLS pseudonym;

at the RD2, associating the encrypted first message with a second EP2 pseudonym as indicated by the first EP2 pseudonym to form a fourteenth message, encrypting the fourteenth message at the second level of encryption, associating the encrypted fourteenth message with a unique third EP2 pseudonym to form a fifteenth message, encrypting the fifteenth message at the third level of encryption, and associating the encrypted fifteenth message with a unique seventh TLS pseudonym for transmission to the UD2;

transmitting the encrypted fifteenth message from the RD2 to the UD2; and at the UD2, decrypting the third level of encryption of the encrypted fifteenth message based on the seventh TLS pseudonym, decrypting the second level of encryption of the encrypted fourteenth message based on the third EP2 pseudonym as indicated by the seventh TLS pseudonym, and decrypting the first level of encryption of the encrypted first message based on the second EP2 pseudonym as indicated by the third EP2 pseudonym.

In an embodiment, the secure communication method further comprises:

at the UD1, encrypting the first message using an encryption key of a first key pair, generating the second message comprising the encrypted first message, encrypting the second message using an encryption key of a second key pair, generating the third message comprising the encrypted second message, encrypting the third message using an encryption key of a first TLS key pair, and generating the encrypted third message;

transmitting the encrypted third message from the UD1 to the RD1;

at the RD1, decrypting the encrypted third message using a decryption key of the first TLS key pair to recover the third message, and decrypting the encrypted second message using a decryption key of the second key pair to recover the second message; at the RD1, encrypting the fourth message using an encryption key of a third key pair, generating the fifth message comprising the encrypted fourth message, encrypting the fifth message using an encryption key of a second TLS key pair, and generating the encrypted fifth message;

transmitting the encrypted fifth message from the RD1 to the CS1;

at the CS1, decrypting the encrypted fifth message using a decryption key of the second TLS key pair to recover the fifth message, decrypting the encrypted fourth message using a decryption key of the third key pair to recover the fourth message, and decrypting the encrypted first message using a decryption key of the first key pair to recover the first message;

at the CS1, encrypting the first message using an encryption key of a fourth key pair, generating the sixth message comprising the once again encrypted first message, encrypting the sixth message using an encryption key of a fifth key pair, generating the seventh message comprising the encrypted sixth message, encrypting the seventh message using an encryption key of a third TLS key pair, and generating the encrypted seventh message;

transmitting the encrypted seventh message from the CS1 to the RD1;

at the RD1, decrypting the encrypted seventh message using a decryption key of the third TLS key pair to recover the seventh message, and decrypting the encrypted sixth message using a decryption key of the fifth key pair to recover the sixth message;

at the RD1, encrypting the eighth message using an encryption key of a sixth key pair, generating the ninth message comprising the encrypted eighth message, encrypting the ninth message using an encryption key of a fourth TLS key pair, and generating the encrypted ninth message;

transmitting the encrypted ninth message from the RD1 to the RD2;

at the RD2, decrypting the encrypted ninth message using a decryption key of the fourth TLS key pair to recover the ninth message, and decrypting the encrypted eighth message using a decryption key of the sixth key pair to recover the eighth message;

at the RD2, encrypting the tenth message using an encryption key of a seventh key pair, generating the eleventh message comprising the encrypted tenth message, encrypting the eleventh message using an encryption key of a fifth TLS key pair, and generating the encrypted eleventh message;

transmitting the encrypted eleventh message from the RD2 to the CS2;

at the CS2, decrypting the encrypted eleventh message using a decryption key of the fifth TLS key pair to recover the eleventh message, decrypting the encrypted tenth message using a decryption key of the seventh key pair to recover the tenth message, and decrypting the encrypted first message using a decryption key of the fourth key pair to recover the first message;

at the CS2, encrypting the first message using an encryption key of an eighth key pair, generating the twelfth message comprising the encrypted first message, encrypting the twelfth message using an encryption key of a ninth key pair, generating the thirteenth message comprising the encrypted twelfth message, encrypting the thirteenth message using an encryption key of a sixth TLS key pair, and generating the encrypted thirteenth message;

transmitting the encrypted thirteenth message from the CS2 to the RD2;

at the RD2, decrypting the encrypted thirteenth message using a decryption key of the sixth TLS key pair to recover the thirteenth message, decrypting the encrypted twelfth message using a decryption key of the ninth key pair to recover the twelfth message;

at the RD2, encrypting the fourteenth message using an encryption key of a tenth key pair, generating the fifteenth message comprising the encrypted fourteenth message, encrypting the fifteenth message using an encryption key of a seventh TLS key pair, and generating the encrypted fifteenth message;

transmitting the encrypted fifteenth message from the RD2 to the UD2; and at the UD2, decrypting the encrypted fifteenth message using a decryption key of the seventh TLS key pair to recover the fifteenth message, decrypting the encrypted fourteenth message using a decryption key of the tenth key pair to recover the fourteenth message, and decrypting the encrypted first message using a decryption key (D8) of the eighth key pair to recover the first message.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 2 illustrates providing three levels of encryption of a first message by an EP1 processing component at a UD1.

FIG. 3 illustrates decrypting the third and second levels of encryption of the first message by an RD1 processing component at an RD1.

FIG. 4 illustrates providing second and third levels of encryption of the first message by the RD1 processing component at the RD1.

FIG. 5 illustrates decrypting the third, second and first levels of encryption of the first message by a PCS1 processing component at a CS1.

FIG. 6 illustrates providing first, second and third levels of encryption of the first message by the PCS1 processing component at the CS1.

FIG. 7 illustrates decrypting the third and second levels of encryption of the first message by the RD1 processing component at the RD1.

FIG. 8 illustrates providing second and third levels of encryption of the first message by the RD1 processing component at the RD1.

FIG. 9 illustrates decrypting the third and second levels of encryption of the first message by an RD2 processing component at an RD2.

FIG. 10 illustrates providing second and third levels of encryption of the first message by the RD2 processing component at the RD2.

FIG. 11 illustrates decrypting the third, second and first levels of encryption of the first message by a PCS2 processing component at a PCS2.

FIG. 12 illustrates providing first, second and third levels of encryption of the first message by the PCS2 processing component at the PCS2.

FIG. 13 illustrates decryption the third and second levels of encryption of the first message by the RD2 processing component at the RD2.

DETAILED DESCRIPTION OF EMBODIMENTS

Figure 1:
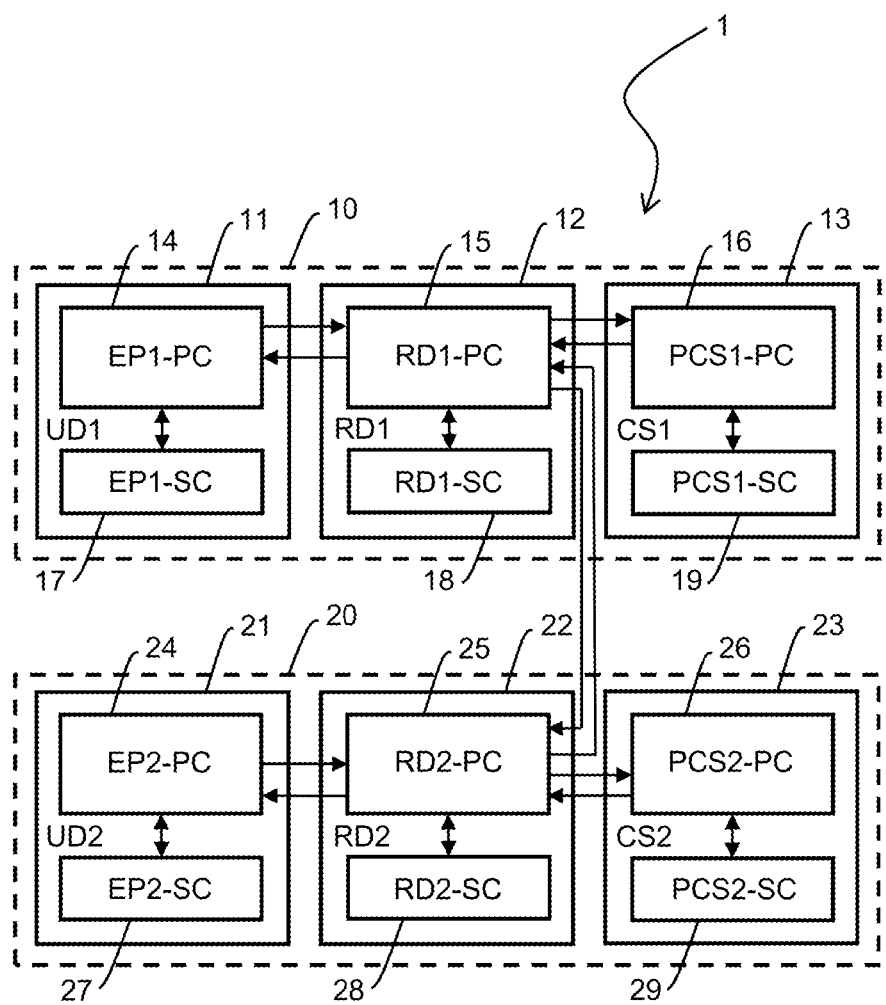
FIG. 1 depicts a block diagram of a secure communication system according to the invention.

FIG. 1 depicts a block diagram of a secure communication system 1 according to the invention. The secure communication system 1 comprises a first pillar system 10 and a second pillar system 20, both indicated by dashed line boxes.

The first pillar system 10 comprises a first user device, UD1, 11, in turn comprising a first endpoint, EP1, processing component, EP1-PC, 14 configured for encrypting and routing a message, and an EP1 storage component, EP1-SC, 17. The first pillar system 10 further comprises a first routing device, RD1, 12, in turn comprising an RD1 processing component, RD1-PC, 15 configured for encrypting, decrypting and routing a message, and an RD1 storage component, RD1-SC, 18. The first pillar system 10 further comprises a first connection server, CS1, 13, in turn comprising a first personal connection server, PCS1, processing component PCS1-PC, 16 configured for encrypting, decrypting and routing a message, and a PCS1 storage component, PCS1-SC, 19.

The second pillar system 20 comprises a second user device, UD2, 21, in turn comprising a second endpoint, EP1, processing component, EP2-PC, 24 configured for decrypting a message, and an EP2 storage component, EP2-SC, 27. The second pillar system 20 further comprises a second routing device, RD2, 22, in turn comprising an RD2 processing component, RD2-PC, 25 configured for encrypting, decrypting and routing a message, and an RD2 storage component, RD2-SC, 28. The second pillar system 20 further comprises a second connection server, CS2, 23, in turn comprising a second personal connection server, PCS2, processing component PCS2-PC, 26 configured for encrypting, decrypting and routing a message and a PCS2 storage component, PCS2-SC, 29.

As indicated by separate arrows in separate directions, messages may be exchanged between EP1-PC 14 and RD1-PC 15, between RD1-PC 15 and PCS1-PC 16, between RD1-PC and RD2-PC 25, between EP2-PC 24 and RD2-PC 25, and between RD2-PC 25 and PCS2-PC 26. Exchange of messages between first pillar system 10 and second pillar system 20 takes place through RD1 12 en RD2 22, in particular through their respective RD1-PC 15 and RD2-PC 25. More in particular, exchange of messages between UD1 11 and UD2 21 (EP1-PC 14 and EP2-PC 24) takes place through RD1 12 en RD2 22, in particular through their respective RD1-PC 15 and RD2-PC 25, in a way explained in more detail below.

Encryption and decryption keys, pseudonyms and other data required for the exchange of the messages may be stored in EP1-SC 17 for retrieval by EP1-PC 14, may be stored in RD1-SC 18 for retrieval by RD1-PC 15, may be stored in PCS1-SC 19 for retrieval by PCS1-PC 16, may be stored in EP2-SC 27 for retrieval by EP2-PC 24, may be stored in RD2-SC 28 for retrieval by RD2-PC 25, and may be stored in PCS2-SC 29 for retrieval by PCS2-PC 26.

The secure communication system 1 is configured for transmitting a first message from the UD1 11 to the UD2 21, that is, from EP1-PC 14 to the EP2-PC 24. In this transmission, the following steps may be taken, wherein the respective components are configured to perform the operation as described.

In the first pillar system 10, at the UD1 11, the EP1-PC 14 encrypts the first message at a first level and at a second level, and encrypts the first message at a third level based on a transport layer security, TLS, protocol. The three times encrypted first message is transmitted from the UD1 11 to the RD1 12 via secure transmission. At the RD1 12, the RD1-PC 15 decrypts the first message at the third level based on the TLS protocol, decrypts the first message at the second level, encrypts the first message at a new second level, and encrypts the first message at a new third level based on the TLS protocol. The three times encrypted first message is transmitted from the RD1 12 to the CS1 13 via secure transmission. At the CS1 13, the PCS1-PC 16 decrypts the first message at the third level based on the TLS protocol, decrypts the first message at the second level and at the first level, encrypts the first message at a new first level and at a new second level, and encrypts the first message at a new third level based on the TLS protocol. The three times encrypted first message is transmitted from the CS1 13 to the RD1 12 via secure transmission. At the RD1 12, the RD1-PC 15 decrypts the first message at the third level based on the TLS protocol, decrypts the first message at the second level, encrypts the first message at a new second level, and encrypts the first message at a new third level based on the TLS protocol. The three times encrypted first message is transmitted from the first pillar system 10 to the second pillar system 20 by transmitting the three times encrypted first message from the RD1 12 to the RD2 22 via secure transmission.

In the second pillar system 20, at the RD2 22, the RD2-PC 25 decrypts the first message at the third level based on the TLS protocol, decrypts the first message at the second level, encrypts the first message at a new second level, and encrypts the first message at a new third level based on the TLS protocol. The three times encrypted first message is transmitted from the RD2 22 to the CS2 23 via secure transmission. At the CS2 23, the PCS2-PC 26 decrypts the first message at the third level based on the TLS protocol, decrypts the first message at the second level and at the first level, encrypts the first message at a new first level and at a new second level, and encrypts the first message at a new third level based on the TLS protocol. The three times encrypted first message is transmitted from the CS2 23 to the RD2 22 via secure transmission. At the RD2 22, the RD2-PC 25 decrypts the first message at the third level based on the TLS protocol, decrypts the first message at the second level, encrypts the first message at a new second level, and encrypts the first message at a new third level based on the TLS protocol. The three times encrypted first message is transmitted from the RD2 22 to the UD2 21 via secure transmission. At the UD2 21, the EP2-PC 24 decrypts the first message at the third level based on the TLS protocol, and decrypts the first message at the second level and at the first level.

Above, transmission of a first message from the UD1 11, in particular from the EP1-PC 14, to the UD2 21, in particular to the EP2-PC 24, has been described. It is noted here that also a message may be transmitted from the UD2 21 to the UD1 11, that is, from EP2-PC 24 to EP1-PC 14, in a similar way, wherein the EP2-PC 24 comprises an encryption and routing function, and wherein the EP1-PC 14 comprises a decryption function. However, the different encryptions/decryptions of the message in this reverse direction transmission differ from the encryptions/decryptions of the first message, resulting in different data. This is indicated by the separate arrows between the different PCs.

The functioning of the secure communication system 1 is explained in more detail below by reference to FIGS. 2 to 15 illustrating encryption and decryption of a first message M1 during transmission of the first message M1 from UD1 11 to UD2 21, in particular from EP1-PC 14 to EP2-PC 24, and by reference to FIGS. 16 to 29 illustrating process steps taken in the transmission.

A transmission of a message from UD2 21 to UD1 11, in particular form EP2-PC 24 to EP1-PC 14, following a path from UD2 to RD2 to CS2 to RD2 to RD1 to CS1 to RD1 to UD1, will require similar steps, however with different pseudonyms and different predefined encryption and decryption keys.

Figure 16:
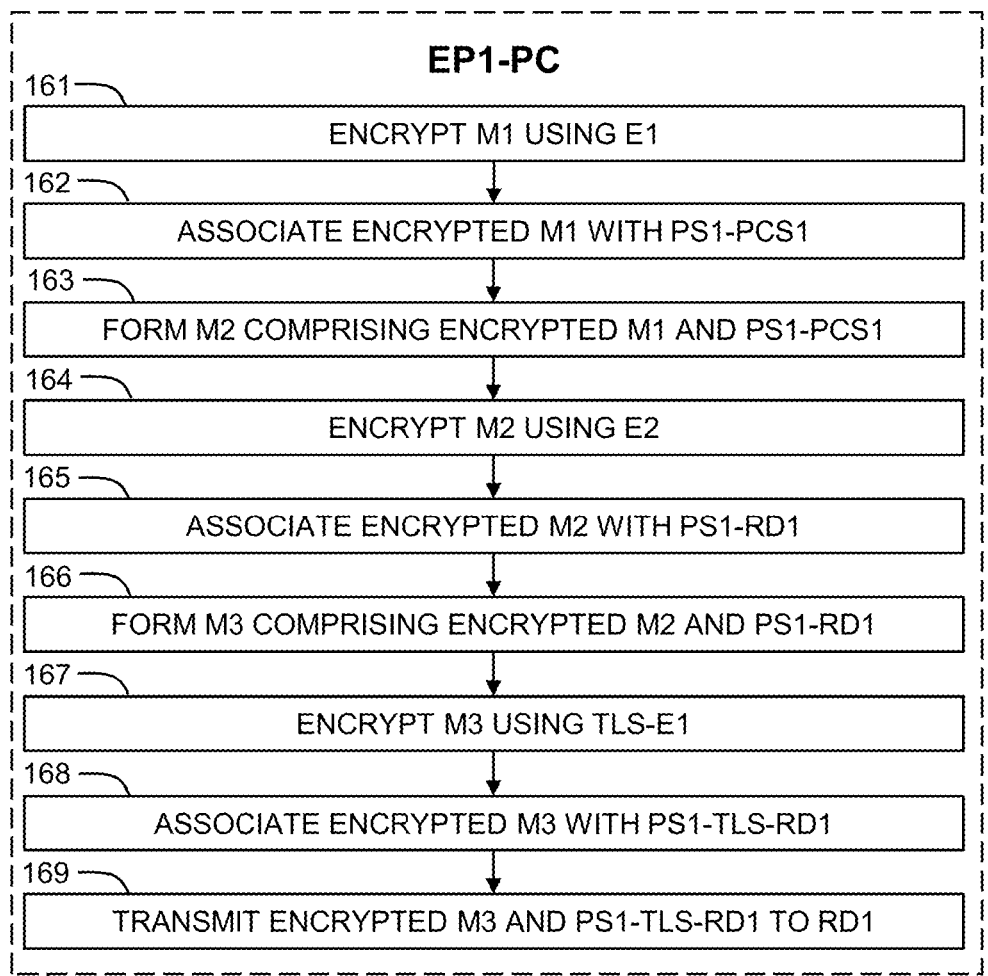
FIG. 16 depicts a flow diagram of an operation of the EP1 processing component in an embodiment of a secure communication method according to the invention.

Referring to FIGS. 2 and 16, at the UD1 11, the EP1-PC 14 encrypts the first message M1 at the first level of encryption using an encryption key E1 of a first key pair (FIG. 16, step 161). The EP1-PC 14 associates the encrypted first message M1 with a unique first PCS1 pseudonym PS1-PCS1 (FIG. 16, step 162) to form a second message M2 comprising the encrypted first message M1 and the first PCS1 pseudonym PS1-PCS1 (FIG. 16, step 163). The EP1-PC 14 encrypts the second message M2 at the second level of encryption using an encryption key E2 of a second key pair (FIG. 16, step 164). The EP1-PC 14 associates the encrypted second message M2 with a unique first RD1 pseudonym PS1-RD1 (FIG. 16, step 165) to form a third message M3 comprising the encrypted second message M2 and the first RD1 pseudonym PS1-RD1 (FIG. 16, step 166). The EP1-PC 14 encrypts the third message M3 at the third level of encryption using an encryption key TLS-E1 of a first TLS key pair to form an encrypted third message M3 (FIG. 16, step 167). The EP1-PC 14 associates the encrypted third message M3 with a unique first TLS pseudonym PS1-TLS-RD1 (FIG. 16, step 168) for transmission of the encrypted third message M3 to RD1 12. The UD1 11 then transmits the encrypted third message M3 and the first TLS pseudonym PS1-TLS-RD1 to the RD1 12 (FIG. 16, step 169).

Figure 17:
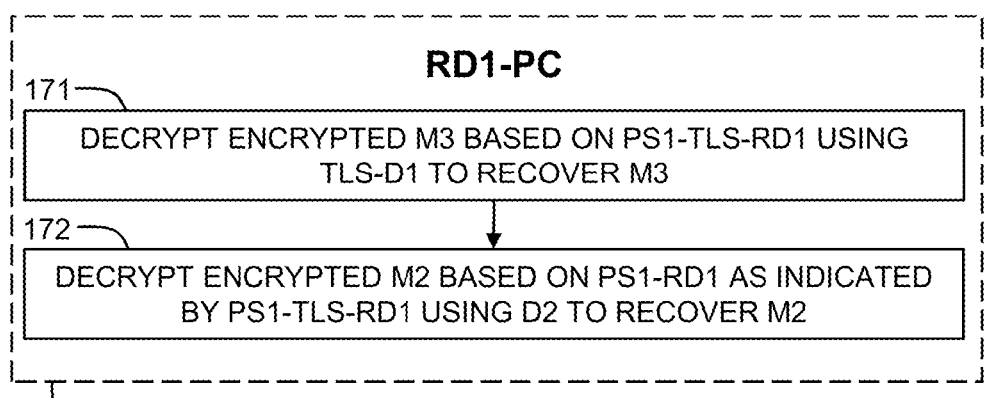
FIGS. 17 and 18 depict a flow diagrams of an operation of the RD1 processing component in an embodiment of a secure communication method according to the invention.

Referring to FIGS. 3 and 17, at the RD1 12, the RD1-PC 15 decrypts the third level of encryption of the encrypted third message M3 based on the first TLS pseudonym PS1-TLS-RD1 using a decryption key TLS-D1 of the first TLS key pair to recover the third message M3 (FIG. 17, step 171). The RD1-PC 15 decrypts the second level of encryption of the encrypted second message M2 based on the first RD1 pseudonym PS1-RD1 as indicated by the first TLS pseudonym PS1-TLS-RD1, using a decryption key D2 of the second key pair to recover the second message M2 (FIG. 17, step 172) comprising the encrypted first message M1 and the first PCS1 pseudonym PS1-PCS1. In the decryption of the second level of encryption, the first TLS pseudonym PS1-TLS-RD1 provides a pointer to the first RD1 pseudonym PS1-RD1, and the first RD1 pseudonym PS1-RD1 provides a pointer to the decryption key D2 of the second key pair.

Figure 18:
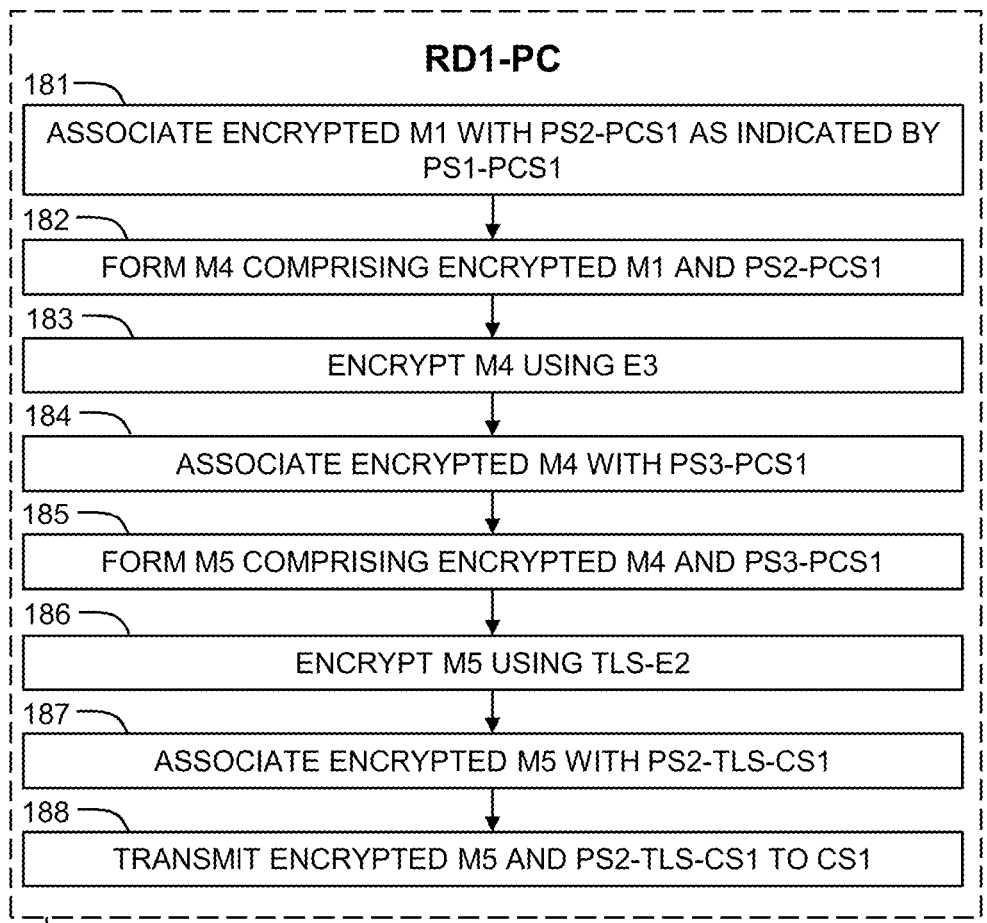

Referring to FIGS. 4 and 18, the RD1-PC 15 associates the encrypted first message M1 with a second PCS1 pseudonym PS2-PCS1 as indicated by the first PCS1 pseudonym PS1-PCS1 (FIG. 18, step 181) (i.e. the first PCS1 pseudonym PS1-PCS1 provides a pointer to the second PCS1 pseudonym PS2-PCS1) to form fourth message M4 comprising the encrypted first message M1 and the second PCS1 pseudonym PS2-PCS1 (FIG. 18, step 182). The RD1-PC 15 encrypts the fourth message M4 at the second level of encryption using an encryption key E3 of a third key pair (FIG. 18, step 183). The RD1-PC 15 associates the encrypted fourth message M4 with a unique third second PCS1 pseudonym PS3-PCS1 (FIG. 18, step 184) to form a fifth message M5 comprising the encrypted fourth message M4 and the third PCS1 pseudonym PS3-PCS1 (FIG. 18, step 185). The RD1-PC encrypts the fifth message M5 at the third level of encryption using an encryption key TLS-E2 of a second TLS key pair (FIG. 18, step 186). The RD1-PC 15 associates the encrypted fifth message M5 with a unique second TLS pseudonym PS2-TLS-CS1 (FIG. 18, step 187) for transmission of the encrypted fifth message M5 to CS1 13. The RD1 12 then transmits the encrypted fifth message M5 and the second TLS pseudonym PS2-TLS-CS1 to the CS1 13 (FIG. 18, step 188).

Figure 19:
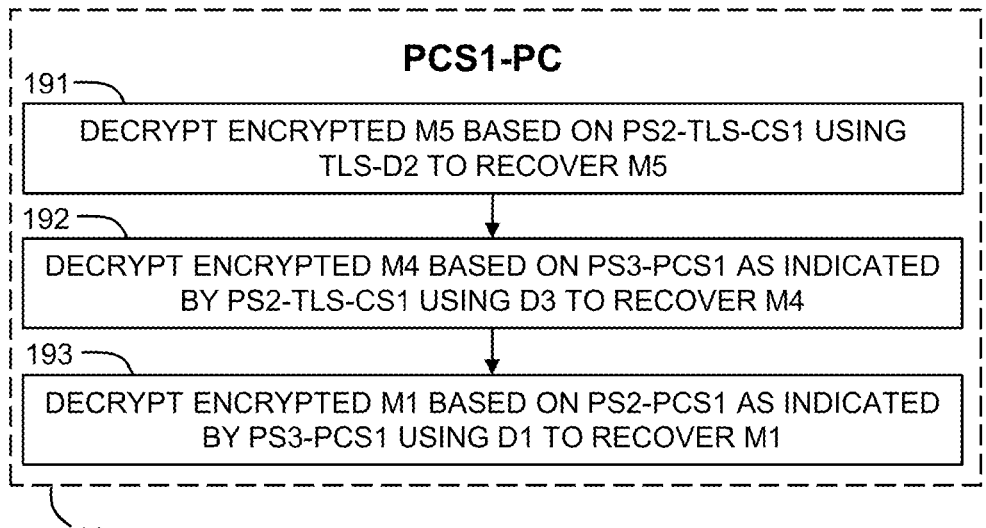
FIGS. 19 and 20 depict flow diagrams of an operation of the PCS1 processing component in an embodiment of a secure communication method according to the invention.

Referring to FIGS. 5 and 19, at the CS1 13, the PCS1-PC 16 decrypts the third level of encryption of the encrypted fifth message M5 based on the second TLS pseudonym PS2-TLS-CS1 using a decryption key TLS-D2 of the second TLS key pair to recover the fifth message M5 (FIG. 19, step 191). The PCS1-PC 16 decrypts the second level of encryption of the encrypted fourth message M4 based on the third PCS1 pseudonym PS3-PCS1 as indicated by the second TLS pseudonym PS2-TLS-CS1 using a decryption key D3 of the third key pair to recover the fourth message M4 (FIG. 19, step 192). In the decryption of the second level of encryption, the second TLS pseudonym PS2-TLS-CS1 provides a pointer to the third PCS1 pseudonym PS3-PCS1, and the third PCS1 pseudonym PS3-PCS1 provides a pointer to the decryption key D3 of the third key pair. The PCS1-PC 16 decrypts the first level of encryption of the encrypted first message M1 based on the second PCS1 pseudonym PS2-PCS1 as indicated by the third PCS1 pseudonym PS3-PCS1 using a decryption key D1 of the first key pair to recover the first message M1 (FIG. 19, step 193). In the decryption of the first level of encryption, the third PCS1 pseudonym PS3-PCS1 provides a pointer to the second PCS1 pseudonym PS2-PCS1, and the second PCS1 pseudonym PS2-PCS1 provides a pointer to the decryption key D1 of the first key pair.

Figure 20:
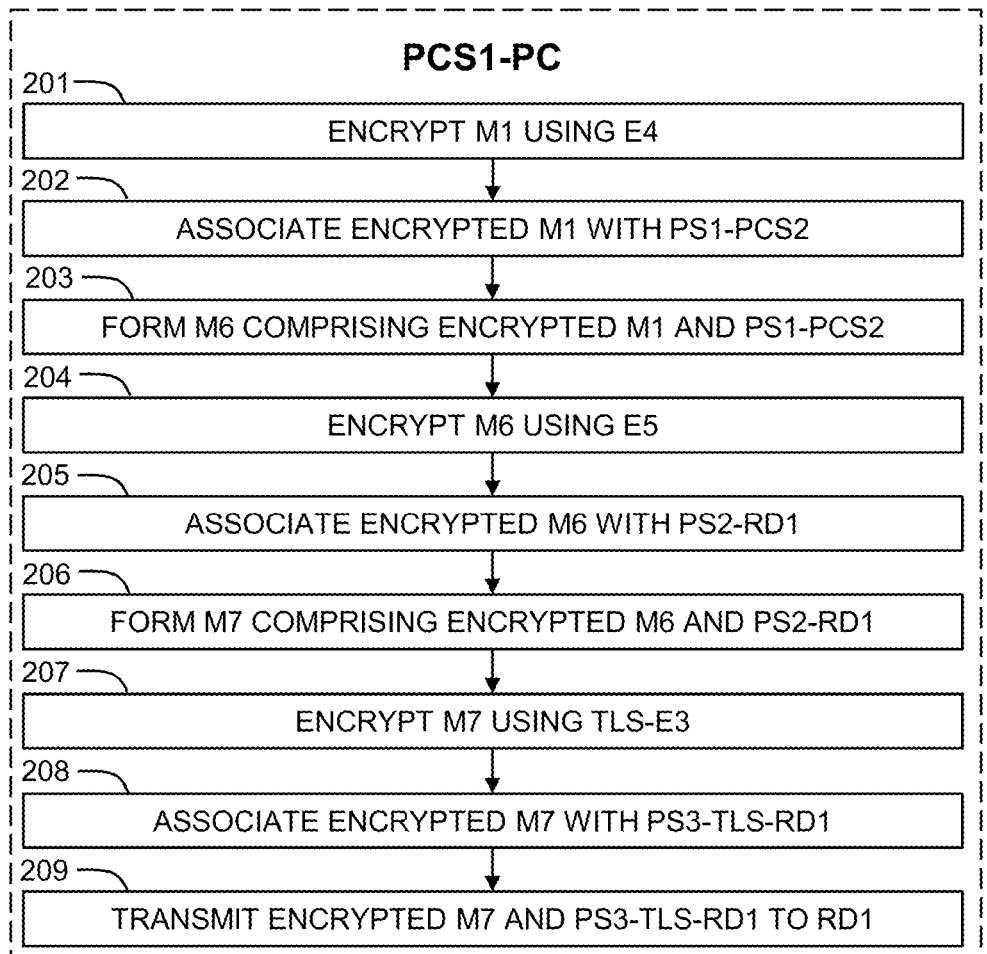

Referring to FIGS. 6 and 20, the PCS1-PC 16 encrypts the first message M1 at the first level of encryption using an encryption key E4 of a fourth key pair (FIG. 20, step 201). The PCS1-PC 16 associates the encrypted first message M1 with a unique first PCS2 pseudonym PS1-PCS2 (FIG. 20, step 202) to form a sixth message M6 comprising the once again encrypted first message M1 and the first PCS2 pseudonym PS1-PCS2 (FIG. 20, step 203). The PCS1-PC 16 encrypts the sixth message M6 at the second level of encryption using an encryption key E5 of a fifth key pair (FIG. 20, step 204). The PCS1-PC 16 associates the encrypted sixth message M6 with a unique second RD1 pseudonym PS2-RD1 (FIG. 20, step 205) to form a seventh message M7 comprising the encrypted sixth message M6 and the second RD1 pseudonym PS2-RD1 (FIG. 20, step 206). The PCS1-PC 16 encrypts the seventh message M7 at the third level of encryption using an encryption key TLS-E3 of a third TLS key pair (FIG. 20, step 207). The PCS1-PC 16 associates the encrypted seventh message M7 with a unique third TLS pseudonym PS3-TLS-RD1 (FIG. 20, step 208) for transmission of the encrypted seventh message M7 to the RD1 12. The PCS1-PC 16 then transmits the encrypted seventh message M7 and the third TLS pseudonym PS3-TLS-RD1 from the CS1 13 to the RD1 12 (FIG. 20, step 209).

Figure 21:
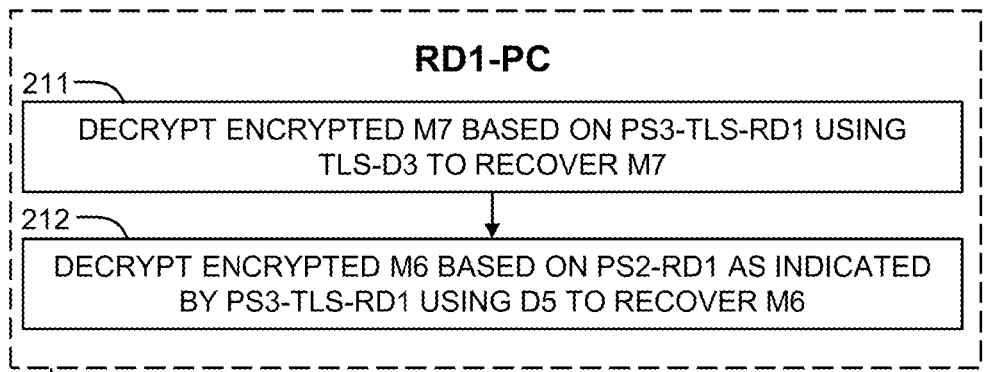
FIGS. 21 and 22 depict flow diagrams of an operation of the RD1 processing component in an embodiment of a secure communication method according to the invention.

Referring to FIGS. 7 and 21, at the RD1 12, the RD1-PC 15 decrypts the third level of encryption of the encrypted seventh message M7 based on the third TLS pseudonym PS3-TLS-RD1 using a decryption key TLS-D3 of the third TLS key pair to recover the seventh message M7 (FIG. 21, step 211). The RD1-PC 15 decrypts the second level of encryption of the encrypted sixth message M6 based on the second RD1 pseudonym PS2-RD1 as indicated by the third TLS pseudonym PS3-TLS-RD1 using a decryption key D5 of the fifth key pair to recover the sixth message M6 comprising the encrypted first message M1 and the first PCS2 pseudonym PS1-PCS2 (FIG. 21, step 212). In the decryption of the second level of encryption, the third TLS pseudonym PS3-TLS-RD1 provides a pointer to the second RD1 pseudonym PS2-RD1, and the second RD1 pseudonym PS2-RD1 provides a pointer to the decryption key D5 of the fifth key pair.

Figure 22:
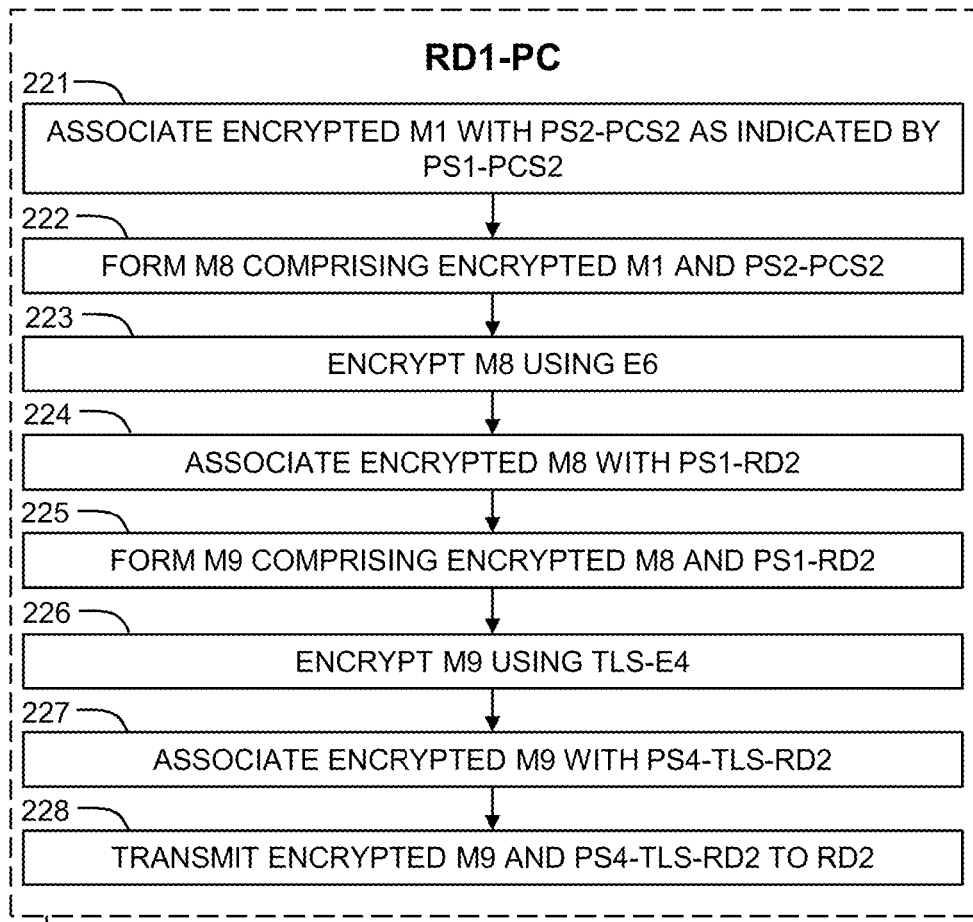

Referring to FIGS. 8 and 22, the RD1-PC 15 associates the encrypted first message M1 with a second PCS2 pseudonym PS2-PCS2 as indicated by the first PCS2 pseudonym PS1-PCS2 (FIG. 22, step 221) (i.e. the first PCS2 pseudonym PS1-PCS2 provides a pointer to the second PCS2 pseudonym PS2-PCS2) to form an eighth message M8 comprising the encrypted first message and the second PCS2 pseudonym PS2-PCS2 (FIG. 22, step 222). The RD1-PC 15 encrypts the eighth message M8 at the second level of encryption using an encryption key E6 of a sixth key pair (FIG. 22, step 223). The RD1-PC 15 associates the encrypted eighth message M8 with a unique first RD2 pseudonym PS1-RD2 (FIG. 22, step 224) to form a ninth message M9 comprising the encrypted eighth message M8 and the first RD2 pseudonym PS1-RD2 (FIG. 22, step 225). The RD1-PC 15 encrypts the ninth message M9 at the third level of encryption using an encryption key TLS-E4 of a fourth TLS key pair (FIG. 22, step 226). The RD1-PC 15 associates the encrypted ninth message M9 with a unique fourth TLS pseudonym PS4-TLS-RD2 (FIG. 22, step 227) for transmission of the encrypted ninth message M9 to RD2 22. The RD1 12 then transmits the encrypted ninth message M9 and the fourth TLS pseudonym PS4-TLS-RD2 to the RD2 22 (FIG. 22, step 228).

Figure 23:
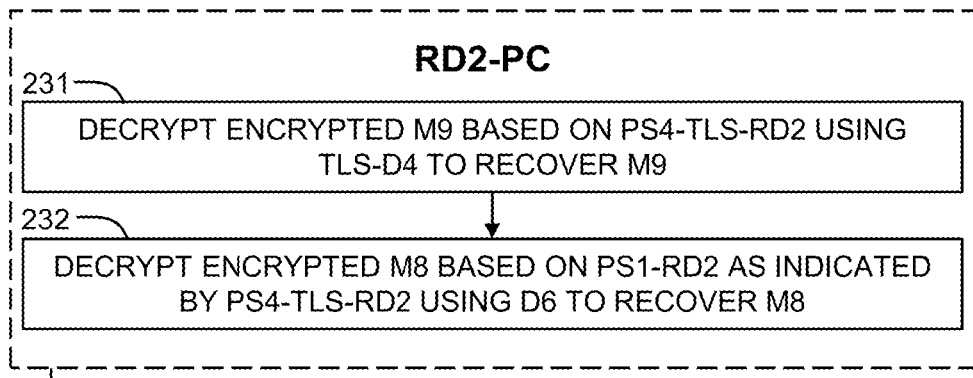
FIGS. 23 and 24 depict flow diagrams of an operation of the RD2 processing component in an embodiment of a secure communication method according to the invention.

Referring to FIGS. 9 and 23, at the RD2 22, the RD2-PC 25 decrypts the third level of encryption of the encrypted ninth message M9 based on the fourth TLS pseudonym PS4-TLS-RD2 using a decryption key TLS-D4 of the fourth TLS key pair to recover the ninth message M9 (FIG. 23, step 231). The RD2-PC 25 decrypts the second level of encryption of the encrypted eighth message M8 based on the first RD2 pseudonym PS1-RD2 as indicated by the fourth TLS pseudonym PS4-TLS-RD2, using a decryption key D6 of the sixth key pair to recover the eighth message M8 comprising the encrypted first message M1 and the second PCS2 pseudonym PS2-PCS2 (FIG. 23, step 232). In the decryption of the second level of encryption, the fourth TLS pseudonym PS4-TLS-RD1 provides a pointer to the first RD2 pseudonym PS1-RD2, and the first RD2 pseudonym PS1-RD2 provides a pointer to the decryption key D6 of the sixth key pair.

Figure 24:
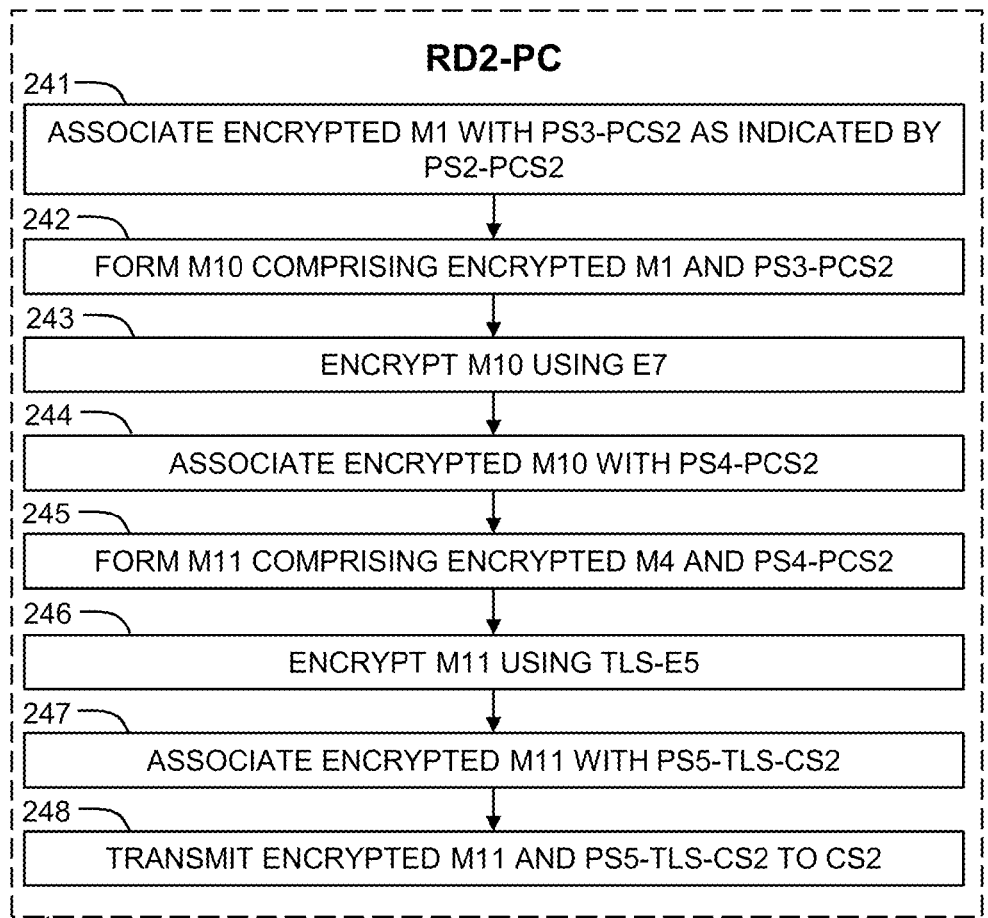

Referring to FIGS. 10 and 24, the RD2-PC 25 associates the encrypted first message M1 with a third PCS2 pseudonym PS3-PCS2 as indicated by the second PCS2 pseudonym PS2-PCS2 (FIG. 24, step 241) (i.e. the second PCS2 pseudonym PS2-PCS2 provides a pointer to the third PCS2 pseudonym PS3-PCS2) to form a tenth message M10 comprising the encrypted first message M1 and the third PCS2 pseudonym PS3-PCS2 (FIG. 24, step 242). The RD2-PC 25 encrypts the tenth message M10 at the second level of encryption using an encryption key E7 of a seventh key pair (FIG. 24, step 243). The RD2-PC 25 associates the encrypted tenth message M10 with a unique fourth PCS2 pseudonym PS4-PCS2 (FIG. 24, step 244) to form an eleventh message M11 comprising the encrypted tenth message M10 and the fourth PCS2 pseudonym P42-PCS2 (FIG. 24, step 245). The RD2-PC 25 encrypts the eleventh message M11 at the third level of encryption using an encryption key TLS-E5 of a fifth TLS key pair (FIG. 24, step 246). The RD2-PC 25 associates the encrypted eleventh message M11 with a unique fifth TLS pseudonym PS5-TLS-CS2 (FIG. 24, step 247) for transmission of the encrypted eleventh message M11 to the CS2 23. The RD2 22 transmits the encrypted eleventh message M11 and the fifth TLS pseudonym PS5-TLS-CS2 to the CS2 23 (FIG. 24, step 246).

Figure 25:
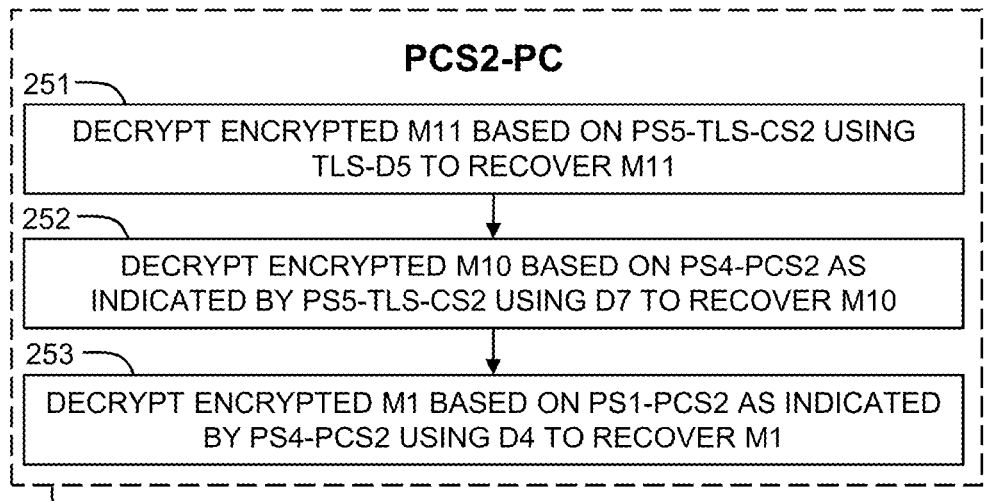
FIGS. 25 and 26 depict flow diagrams of an operation of the PCS2 processing component in an embodiment of a secure communication method according to the invention.

Referring to FIGS. 11 and 25, at the CS2 23, the PCS2-PC 26 decrypts the third level of encryption of the encrypted eleventh message M11 based on the fifth TLS pseudonym PS5-TLS-CS2 using a decryption key TLS-D5 of the fifth TLS key pair to recover the eleventh message M11 (FIG. 25, step 251). The PCS2-PC 26 decrypts the second level of encryption of the encrypted tenth message M10 based on the fourth PCS2 pseudonym PS4-PCS2 as indicated by the fifth TLS pseudonym PS5-TLS-CS2, using a decryption key D7 of the seventh key pair to recover the tenth message M10 (FIG. 25, step 252). In the decryption of the second level of encryption, the fifth TLS pseudonym PS5-TLS-CS2 provides a pointer to the fourth PCS2 pseudonym PS4-PCS2, and the fourth PCS2 pseudonym PS4-PCS2 provides a pointer to the decryption key D7 of the seventh key pair. The PCS2-PC 26 decrypts the first level of encryption of the encrypted first message M1 based on the first PCS2 pseudonym PS1-PCS2 as indicated by the fourth PCS2 pseudonym PS4-PCS2, using a decryption key D4 of the fourth key pair to recover the first message M1 (FIG. 25, step 253). In the decryption of the first level of encryption, the fourth PCS2 pseudonym PS4-PCS2 provides a pointer to the first PCS2 pseudonym PS1-PCS2, and the first PCS2 pseudonym PS1-PCS2 provides a pointer to the decryption key D4 of the fourth key pair.

Figure 26:
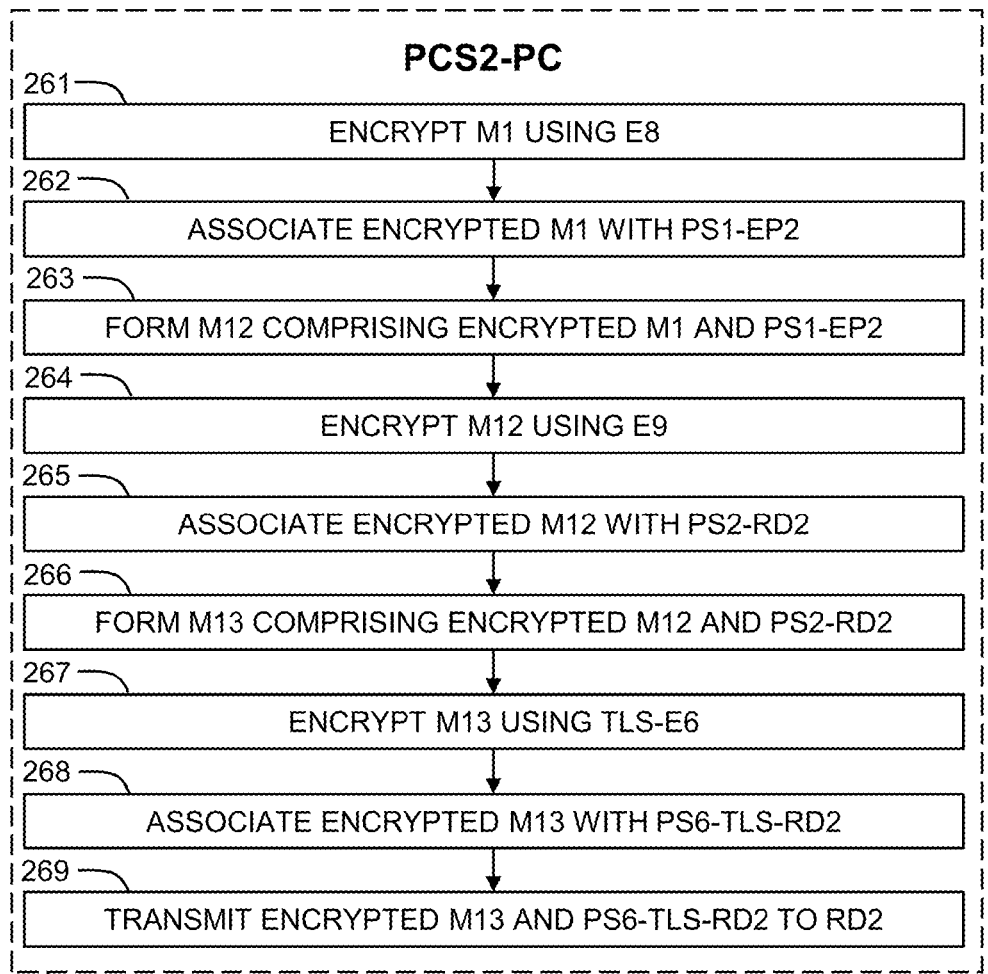

Referring to FIGS. 12 and 26, the PCS2-PC 26 encrypts the first message M1 at the first level of encryption using an encryption key E8 of an eighth key pair (FIG. 26, step 261). The PCS2-PC 26 associates the encrypted first message M1 with a unique first EP2 pseudonym PS1-EP2 (FIG. 26, step 262) to form a twelfth message M12 comprising the encrypted first message M1 and the first EP2 pseudonym PS1-EP2 (FIG. 26, step 263). The PCS2-PC 26 encrypts the twelfth message M12 at the second level of encryption using an encryption key E9 of a ninth key pair (FIG. 26, step 264). The PCS2-PC 26 associates the encrypted twelfth message M12 with a unique second RD2 pseudonym PS2-RD2 (FIG. 26, step 265) to form a thirteenth message M13 comprising the encrypted twelfth message M12 and the second RD2 pseudonym PS2-RD2 (FIG. 26, step 266). The PCS2-PC 26 encrypts the thirteenth message M13 at the third level of encryption using an encryption key TLS-E6 of a sixth TLS key pair (FIG. 26, step 267). The PCS2-PC 26 associates the encrypted thirteenth message M13 with a unique sixth TLS pseudonym PS6-TLS-RD2 (FIG. 26, step 268) for transmission of the encrypted thirteenth message M13 to the RD2 22. The CS2 23 then transmits the encrypted thirteenth message M13 and the sixth TLS pseudonym PS6-TLS-RD2 to the RD2 22 (FIG. 26, step 267).

Figure 27:
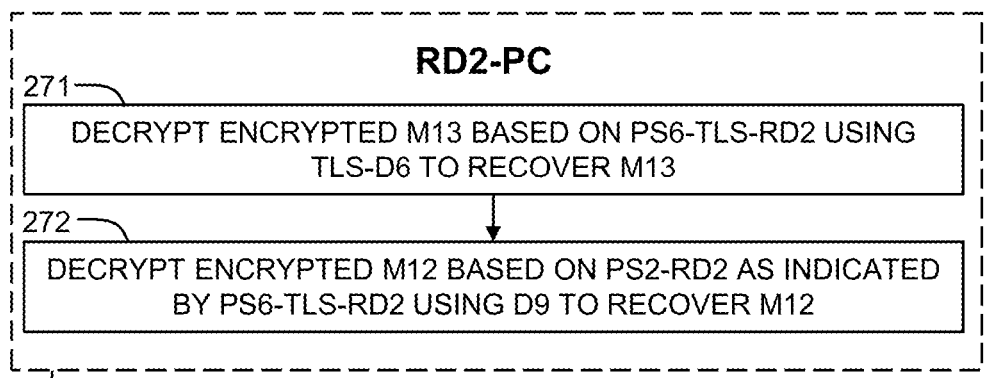
FIGS. 27 and 28 depict flow diagrams of an operation of the RD2 processing component in an embodiment of a secure communication method according to the invention.

Referring to FIGS. 13 and 27, at the RD2 22, the RD2-PC 25 decrypts the third level of encryption of the encrypted thirteenth message M13 based on the sixth TLS pseudonym PS6-TLS-RD2 using a decryption key TLS-D6 of the sixth TLS key pair to recover the thirteenth message M13 (FIG. 27, step 271). The RD2-PC 25 decrypts the second level of encryption of the encrypted twelfth message M12 based on the second RD2 pseudonym PS2-RD2 as indicated by the sixth TLS pseudonym PS6-TLS-RD2, using a decryption key D9 of the ninth key pair to recover the twelfth message M12 (FIG. 27, step 272). In the decryption of the second level of encryption, the sixth TLS pseudonym PS6-TLS-RD2 provides a pointer to the second RD2 pseudonym PS2-RD2, and the second RD2 pseudonym PS2-RD2 provides a pointer to the decryption key D9 of the ninth key pair.

Figures 14, 15:
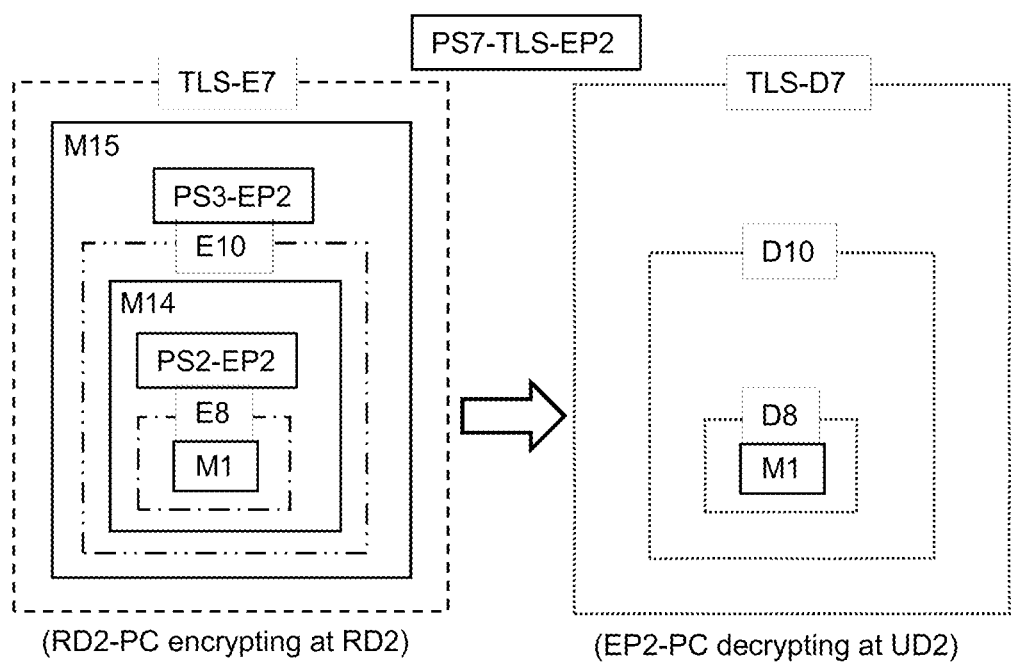
FIG. 14 illustrates providing second and third levels of encryption of the first message by the RD2 processing component at the RD2.
FIG. 15 illustrates decrypting the third, second and first levels of encryption of the first message by an EP2 processing component at a UD2.
Figure 28:
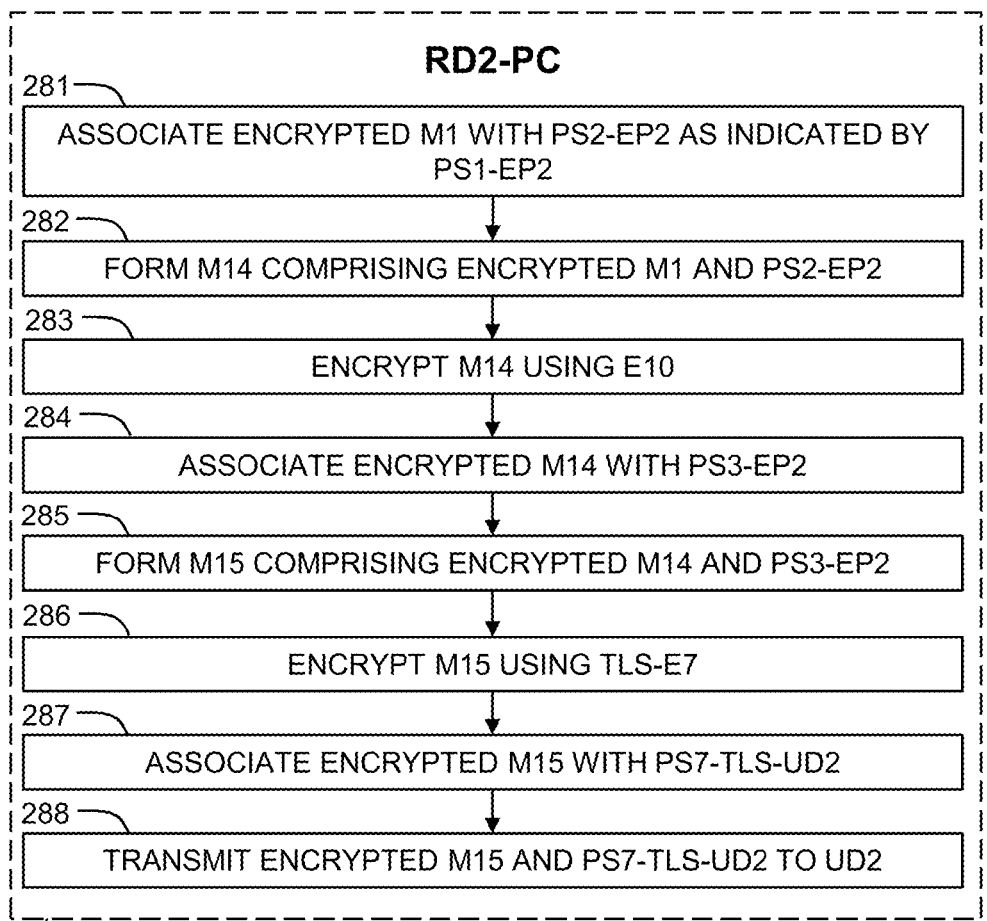

Referring to FIGS. 14 and 28, the RD2-PC 25 associates the encrypted first message with a second EP2 pseudonym PS2-EP2 as indicated by the first EP2 pseudonym PS1-EP2 (FIG. 28, step 281) (i.e. the first EP2 pseudonym PS1-EP2 provides a pointer to the second EP2 pseudonym PS2-EP2) to form a fourteenth message M14 comprising the encrypted first message M1 and the second EP2 pseudonym PS2-EP2 (FIG. 28, step 282). The RD2-PC 25 encrypts the fourteenth message M14 at the second level of encryption using an encryption key E10 of a tenth key pair (FIG. 28, step 283). The RD2-PC 25 associates the encrypted fourteenth message M14 with a unique third EP2 pseudonym PS3-EP2 (FIG. 28, step 284) to form an fifteenth message M15 comprising the encrypted fourteenth message M14 and the third EP2 pseudonym PS3-EP2 (FIG. 28, step 285). The RD2-PC 25 encrypts the fifteenth message M15 at the third level of encryption using an encryption key TLS-E7 of a seventh TLS key pair (FIG. 28, step 286). The RD2-PC 25 associates the encrypted fifteenth message M15 with a unique seventh TLS pseudonym PS7-TLS-UD2 (FIG. 28, step 287) for transmission of the encrypted fifteenth message M15 to the UD2 21. The RD2 22 then transmits the encrypted fifteenth message M15 and the seventh TLS pseudonym PS7-TLS-UD2 to the UD2 21 (FIG. 28, step 288).

Figure 29:
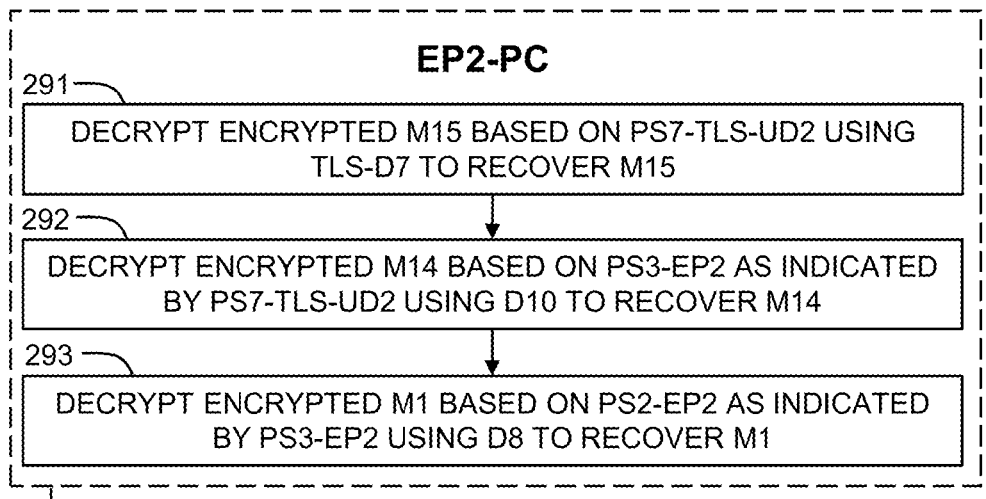
FIG. 29 depicts a flow diagram of an operation of the EP2 processing component in an embodiment of a secure communication method according to the invention.

Referring to FIGS. 15 and 29, at the UD2 21, the EP2-PC 24 decrypts the third level of encryption of the encrypted fifteenth message M15 based on the seventh TLS pseudonym PS7-TLS-UD2 using a decryption key TLS-D7 of the seventh TLS key pair to recover the fifteenth message M15 (FIG. 29, step 291). The EP2-PC 24 decrypts the second level of encryption of the encrypted fourteenth message M14 based on the third EP2 pseudonym PS3-EP2 as indicated by the seventh TLS pseudonym PS7-TLS-UD2, using a decryption key D10 of the tenth key pair to recover the fourteenth message M14 (FIG. 29, step 292). In the decryption of the second level of encryption, the seventh TLS pseudonym PS7-TLS-UD2 provides a pointer to the third EP2 pseudonym PS3-EP2, and the third EP2 pseudonym PS3-EP2 provides a pointer to the decryption key D10 of the tenth key pair. The EP2-PC 24 decrypts the first level of encryption of the encrypted first message M1 based on the second EP2 pseudonym PS2-EP2 as indicated by the third EP2 pseudonym PS3-EP2, using a decryption key D8 of the eighth key pair to recover the first message M1 (FIG. 29, step 293). In the decryption of the first level of encryption, the third EP2 pseudonym PS3-EP2 provides a pointer to the second EP2 pseudonym PS2-EP2, and the second EP2 pseudonym PS2-EP2 provides a pointer to the decryption key D8 of the eighth key pair.

This completes the secure transmission of the first message M1 from the UD1 11 (or EP1-PC 14) to the UD2 21 (or EP2-PC 24).

In the following, relevant preparatory actions for enabling the above secure communication system and operations are explained.

In a first phase, a pillar system is created. An independent party, which may be the present patentee, acts as a Certificate Authority, CA. The CA develops software, provides keys for root certificates, demands users to install Chinese walls, if applicable, and may take corrective measures through cancelling certificates.

The CA appoints an Intermediate Authority, IA. This is an organization managing one or more RDs. The IA creates its own router keys, and determines which RDs are deployed.

For a first pillar system, the processing components EP1-PC, RD1-PC and PCS1-PC are to be prepared and installed. These processing components may all be servers, having a client-server relationship between each other. The EP1-PC may function of a consumer device, such as an app, or a producer device, such as an API server.

EP1-PC and RD1 may be managed by the same party. However, an organizational partition (at least a Chinese wall) should exist between a party managing the RD1 and a party managing the PCS1 in order to guarantee or be able to show the required trust in the PCS1.

In detail, the following steps are taken:
RD1 generates its own router SSL keys (for third level encryption) and EP identification keys (private and public keys) for identification of future connected EPs;
A user installs an app, herein referred to as PCC-app, downloadable through a public store, to generate EP1-PC.
At the installation of the PCC-app, the PCC-app identifies itself through the EP identification at RD1.
As a result, RD1-PC transmits EP SSL keys and pseudonyms to EP1-PC. Also, RD1-PC sends CS1 SSL keys and pseudonyms to CS1, informing CS1. This is necessary for the third level SSL connection.
RD1-PC transmits pseudonyms and EP encryption keys to EP1-PC, and pseudonyms and CS1 encryption keys to PCS1-PC (in fact, the pseudonym defines a PCS1-PC). This is necessary for the second level encryption/decryption.
It is noted here that while sending the CS1 encryption keys to PCS1-PC, EP1-PC and RD1-PC are unaware of the routing of the keys. They just know that the keys are headed for the CS1, and that a PCS1-PC exists, but they do not know at which address the PCS1-PC is located within the CS1 environment. With a good organisational separation, RD1-PC does not know the location of the CS1. Only the operation of the PCS1-PC is pre-known, and the fact that the original user managing an EP is not known.
After the RD1-PC has sent the CS1 encryption keys to CS1, a PCS1 installs itself at the CS1. PCS1-PC generates a PCS1 Certificate Authority (PCS1-CA) itself, providing encryption/decryption keys and signing keys.
The result of taking the preceding steps is that the second and third level keys and pseudonyms have been distributed across EP1, RD1 and PCS1.
After this, the PCS1-PC sends the PCS1 encryption keys directly to EP1-PC. This can only be performed if the right keys that were distributed before, are used in the right following order. RD1-PC cannot read the first message in the communication between the EP1-PC and the PCS1-PC.
The result of the latter steps is that the first level keys and pseudonyms have been exchanged between EP1-PC and PCS1-PC. The EP1-PC is completely installed only when the PCS1-PC is coupled to the EP1-PC.

As explained in detail above, in a secure communication system and method, a (first) message is transmitted between a first user device and a second user device. At the first user device, the message is encrypted at three levels. The thrice encrypted message is transmitted from the first user device to a first routing device. At the first routing device, the message is decrypted at the third and second levels, and encrypted at new second and third levels. The thrice encrypted message is transmitted from the first routing device to a first connection server. At the first connection server, the message is decrypted at the third, second and first levels, and encrypted at new first, second and third levels. The thrice encrypted message is transmitted from the first connection server to the first routing device. At the first routing device, the message is decrypted at the third and second levels, and encrypted at new second and third levels. The thrice encrypted message is transmitted from the first routing device to a second routing device. At the second routing device, the message is decrypted at the third and second levels, and encrypted at new second and third levels. The thrice encrypted message is transmitted from the second routing device to a second connection server. At the second connection server, the message is decrypted at the third, second and first levels, and encrypted at new first, second and third levels. The thrice encrypted message is transmitted from the second connection server to the second routing device. At the second routing device, the message is decrypted at the third and second levels, and encrypted at new second and third levels. The thrice encrypted message is transmitted from the second routing device to the second user device. At the second user device, the message is decrypted at the third, second and first levels.

In other words, in a secure communication system and method, a (first) message is transmitted between a first user device and a second user device through a first routing device, a first connection server, the first routing device, a second routing device, a second connection server, and the second routing device. At the first user device, the message is encrypted at three levels. At the first routing device and the second routing device, the message is decrypted at the third and second levels, and encrypted at new second and third levels. At the first connection server and the second connection server, the message is decrypted at the third, second and first levels, and encrypted at new first, second and third levels. At the second user device, the message is decrypted at the third, second and first levels to retrieve the original message.

As required, detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A secure communication system for transmission of messages, the system comprising:
    a first pillar system, comprising:
        a first user device, UD1, comprising at least one first endpoint, EP1, processing component configured for encrypting and routing a message;
        a first routing device, RD1, comprising an RD1 processing component configured for encrypting, decrypting and routing a message; and
        a first connection server, CS1, comprising at least one first personal connection server, PCS1, processing component configured for encrypting, decrypting and routing a message; and
    a second pillar system, comprising:
        a second user device, UD2, comprising at least one second endpoint, EP2, processing component configured for decrypting a message;
        a second routing device, RD2, comprising an RD2 processing component configured for encrypting, decrypting and routing a message;
        a second connection server, CS2, comprising at least one second personal connection server, PCS2, processing component configured for encrypting, decrypting and routing a message;
    wherein the system is configured for transmitting a first message from the EP1 processing component to the EP2 processing component by:
    in the first pillar system:
        at the UD1, the EP1 processing component encrypting the first message at a first level and at a second level, and encrypting the first message at a third level based on a transport layer security, TLS, protocol;
        transmitting the three times encrypted first message from the UD1 to the RD1 via secure transmission;
        at the RD1, the RD1 processing component decrypting the first message at the third level based on the TLS protocol, decrypting the first message at the second level, encrypting the first message at a new second level, and encrypting the first message at a new third level based on the TLS protocol;
        transmitting the three times encrypted first message from the RD1 to the CS1 via secure transmission;
        at the CS1, the PCS1 processing component decrypting the first message at the third level based on the TLS protocol, decrypting the first message at the second level and at the first level, encrypting the first message at a new first level and at a new second level, and encrypting the first message at a new third level based on the TLS protocol;
        transmitting the three times encrypted first message from the CS1 to the RD1 via secure transmission;
        at the RD1, the RD1 processing component decrypting the first message at the third level based on the TLS protocol, decrypting the first message at the second level, encrypting the first message at a new second level, and encrypting the first message at a new third level based on the TLS protocol;
    transmitting the three times encrypted first message from the first pillar system to the second pillar system by transmitting the three times encrypted first message from the RD1 to the RD2 via secure transmission;
    in the second pillar system:

at the RD2, the RD2 processing component decrypting the first message at the third level based on the TLS protocol, decrypting the first message at the second level, encrypting the first message at a new second level, and encrypting the first message at a new third level based on the TLS protocol;

transmitting the three times encrypted first message from the RD2 to the CS2 via secure transmission;

at the CS2, the PCS2 processing component decrypting the first message at the third level based on the TLS protocol, decrypting the first message at the second level and at the first level, encrypting the first message at a new first level and at a new second level, and encrypting the first message at a new third level based on the TLS protocol;

transmitting the three times encrypted first message from the CS2 to the RD2 via secure transmission;

at the RD2, the RD2 processing component decrypting the first message at the third level based on the TLS protocol, decrypting the first message at the second level, encrypting the first message at a new second level, and encrypting the first message at a new third level based on the TLS protocol;

transmitting the three times encrypted first message from the RD2 to the UD2 via secure transmission; and at the UD2, the EP2 processing component decrypting the first message at the third level based on the TLS protocol, and decrypting the first message at the second level and at the first level.

2. The secure communication system according to claim 1, wherein the system is further configured for transmitting the first message from the EP1 processing component to the EP2 processing component by:

at the UD1, the EP1 processing component encrypting the first message at the first level of encryption, associating the encrypted first message with a unique first PCS1 pseudonym (PS1-PCS1) to form a second message, encrypting the second message at the second level of encryption, associating the encrypted second message with a unique first RD1 pseudonym (PS1-RD1) to form a third message, encrypting the third message at the third level of encryption, and associating the encrypted third message with a unique first TLS pseudonym (PS1-TLS-RD1) for transmission to the RD1;

transmitting the encrypted third message from the UD1 to the RD1;

at the RD1, the RD1 processing component decrypting the third level of encryption of the encrypted third message based on the first TLS pseudonym (PS1-TLS-RD1), and decrypting the second level of encryption of the encrypted second message based on the first RD1 pseudonym (PS1-RD1) as indicated by the first TLS pseudonym (PS1-TLS-RD1);

at the RD1, the RD1 processing component associating the encrypted first message with a second PCS1 pseudonym (PS2-PCS1) as indicated by the first PCS1 pseudonym (PS1-PCS1) to form a fourth message, encrypting the fourth message at the second level of encryption, associating the encrypted fourth message with a unique third PCS1 pseudonym (PS3-PCS1) to form a fifth message, encrypting the fifth message at the third level of encryption, and associating the encrypted fifth message with a unique second TLS pseudonym (PS2-TLS-CS1) for transmission to the CS1;

transmitting the encrypted fifth message from the RD1 to the CS1;

at the CS1, the PCS1 processing component decrypting the third level of encryption of the encrypted fifth message based on the second TLS pseudonym (PS2-TLS-CS1), decrypting the second level of encryption of the encrypted fourth message based on the third PCS1 pseudonym (PS3-PCS1) as indicated by the second TLS pseudonym (PS2-TLS-CS1), and decrypting the first level of encryption of the encrypted first message based on the second PCS1 pseudonym (PS2-PCS1) as indicated by the third PCS1 pseudonym (PS3-PCS1);

at the CS1, the PCS1 processing component encrypting the first message at the first level of encryption, associating the encrypted first message with a unique first PCS2 pseudonym (PS1-PCS2) to form a sixth message, encrypting the sixth message at the second level of encryption, associating the encrypted sixth message with a unique second RD1 pseudonym (PS2-RD1) to form a seventh message, encrypting the seventh message at the third level of encryption, and associating the encrypted seventh message with a unique third TLS pseudonym (PS3-TLS-RD1) for transmission to the RD1;

transmitting the encrypted seventh message from the CS1 to the RD1;

at the RD1, the RD1 processing component decrypting the third level of encryption of the encrypted seventh message based on the third TLS pseudonym (PS3-TLS-RD1), and decrypting the second level of encryption of the encrypted sixth message based on the second RD1 pseudonym (PS2-RD1) as indicated by the third TLS pseudonym (PS3-TLS-RD1);

at the RD1, the RD1 processing component associating the encrypted first message with a second PCS2 pseudonym (PS2-PCS2) as indicated by the first PCS2 pseudonym (PS1-PCS2) to form an eighth message, encrypting the eighth message at the second level of encryption, associating the encrypted eighth message with a unique first RD2 pseudonym (PS1-RD2) to form a ninth message, encrypting the ninth message at the third level of encryption, and associating the encrypted ninth message with a unique fourth TLS pseudonym (PS4-TLS-RD2) for transmission to the RD2;

transmitting the encrypted ninth message from the RD1 to the RD2;

at the RD2, the RD2 processing component decrypting the third level of encryption of the encrypted ninth message based on the fourth TLS pseudonym (PS4-TLS-RD2), and decrypting the second level of encryption of the encrypted eighth message based on the first RD2 pseudonym (PS1-RD2) as indicated by the fourth TLS pseudonym (PS4-TLS-RD2);

at the RD2, the RD2 processing component associating the encrypted first message with a third PCS2 pseudonym (PS3-PCS2) as indicated by the second PCS2 pseudonym (PS2-PCS2) to form a tenth message, encrypting the tenth message at the second level of encryption, associating the encrypted tenth message with a unique second PCS2 pseudonym (PS2-PCS2) to form an eleventh message, encrypting the eleventh message at the third level of encryption, and associating the encrypted eleventh message with a unique fifth TLS pseudonym (PS5-TLS-CS2) for transmission to the CS2;

transmitting the encrypted eleventh message from the RD2 to the CS2;

at the CS2, the PCS2 processing component decrypting the third level of encryption of the encrypted eleventh message based on the fifth TLS pseudonym (PS5-TLS-CS2), decrypting the second level of encryption of the encrypted tenth message based on the fourth PCS2 pseudonym (PS4-PCS2) as indicated by the fifth TLS pseudonym (PS5-TLS-PCS2), and decrypting the first level of encryption of the encrypted first message based on the third PCS2 pseudonym (PS3-PCS2) as indicated by the fourth PCS2 pseudonym (PS4-PCS2);

at the CS2, the PCS2 processing component encrypting the first message at the first level of encryption, associating the first message with a unique first EP2 pseudonym (PS1-EP2) to form a twelfth message, encrypting the twelfth message at the second level of encryption, associating the encrypted twelfth message with a unique second RD2 pseudonym (PS2-RD2) to form a thirteenth message, encrypting the thirteenth message at the third level of encryption, and associating the encrypted thirteenth message with a unique sixth TLS pseudonym (PS6-TLS-RD2) for transmission to the RD2;

transmitting the encrypted thirteenth message from the CS2 to the RD2;

at the RD2, the RD2 processing component decrypting the third level of encryption of the encrypted thirteenth message based on the sixth TLS pseudonym (PS6-TLS-RD2), and decrypting the second level of encryption of the encrypted twelfth message based on the second RD2 pseudonym (PS2-RD2) as indicated by the sixth TLS pseudonym (PS6-TLS-RD2);

at the RD2, the RD2 processing component associating the encrypted first message with a second EP2 pseudonym (PS2-EP2) as indicated by the first EP2 pseudonym (PS1-EP2) to form a fourteenth message, encrypting the fourteenth message at the second level of encryption, associating the encrypted fourteenth message with a unique third EP2 pseudonym (PS3-EP2) to form a fifteenth message, encrypting the fifteenth message at the third level of encryption, and associating the encrypted fifteenth message with a unique seventh TLS pseudonym (PS7-TLS-UD2) for transmission to the UD2;

transmitting the encrypted fifteenth message from the RD2 to the UD2; and at the UD2, the EP2 processing component decrypting the third level of encryption of the encrypted fifteenth message based on the seventh TLS pseudonym (PS7-TLS-UD2), decrypting the second level of encryption of the encrypted fourteenth message based on the third EP2 pseudonym (PS3-EP2) as indicated by the seventh TLS pseudonym (PS7-TLS-UD2), and decrypting the first level of encryption of the encrypted first message based on the second EP2 pseudonym (PS2-EP2) as indicated by the third EP2 pseudonym (PS3-EP2).

3. The secure communication system according to claim 2, wherein the system is further configured for transmitting a first message from the EP1 processing component to the EP2 processing component by:

at the UD1, the EP1 processing component encrypting the first message using an encryption key (E1) of a first key pair, generating the second message comprising the encrypted first message, encrypting the second message using an encryption key (E2) of a second key pair, generating the third message comprising the encrypted second message, encrypting the third message using an encryption key (TLS-E1) of a first TLS key pair, and generating the encrypted third message;

transmitting the encrypted third message from the UD1 to the RD1;

at the RD1, the RD1 processing component decrypting the encrypted third message using a decryption key (TLS-D1) of the first TLS key pair to recover the third message, and decrypting the encrypted second message using a decryption key (D2) of the second key pair to recover the second message;

at the RD1, the RD1 processing component encrypting the fourth message using an encryption key (E3) of a third key pair, generating the fifth message comprising the encrypted fourth message, encrypting the fifth message using an encryption key (TLS-E2) of a second TLS key pair, and generating the encrypted fifth message;

transmitting the encrypted fifth message from the RD1 to the CS1;

at the CS1, the PCS1 processing component decrypting the encrypted fifth message using a decryption key (TLS-D2) of the second TLS key pair to recover the fifth message, decrypting the encrypted fourth message using a decryption key (D3) of the third key pair to recover the fourth message, and decrypting the encrypted first message using a decryption key (D1) of the first key pair to recover the first message;

at the CS1, the PCS1 processing component encrypting the first message using an encryption key (E4) of a fourth key pair, generating the sixth message comprising the once again encrypted first message, encrypting the sixth message using an encryption key (E5) of a fifth key pair, generating the seventh message comprising the encrypted sixth message, encrypting the seventh message using an encryption key (TLS-E3) of a third TLS key pair, and generating the encrypted seventh message;

transmitting the encrypted seventh message from the CS1 to the RD1;

at the RD1, the RD1 processing component decrypting the encrypted seventh message using a decryption key (TLS-D3) of the third TLS key pair to recover the seventh message, and decrypting the encrypted sixth message using a decryption key (D5) of the fifth key pair to recover the sixth message;

at the RD1, the RD1 processing component encrypting the eighth message using an encryption key (E6) of a sixth key pair, generating the ninth message comprising the encrypted eighth message, encrypting the ninth message using an encryption key (TLS-E4) of a fourth TLS key pair, and generating the encrypted ninth message;

transmitting the encrypted ninth message from the RD1 to the RD2;

at the RD2, the RD2 processing component decrypting the encrypted ninth message using a decryption key (TLS-D4) of the fourth TLS key pair to recover the ninth message, and decrypting the encrypted eighth message using a decryption key (D6) of the sixth key pair to recover the eighth message;

at the RD2, the RD2 processing component encrypting the tenth message using an encryption key (E7) of a seventh key pair, generating the eleventh message comprising the encrypted tenth message, encrypting the eleventh message using an encryption key (TLS-E5) of a fifth TLS key pair, and generating the encrypted eleventh message;

transmitting the encrypted eleventh message from the RD2 to the CS2;

at the CS2, the PCS2 processing component decrypting the encrypted eleventh message using a decryption key (TLS-D5) of the fifth TLS key pair to recover the eleventh message, decrypting the encrypted tenth message using a decryption key (D7) of the seventh key pair to recover the tenth message, and decrypting the encrypted first message using a decryption key (D4) of the fourth key pair to recover the first message;

at the CS2, the PCS2 processing component encrypting the first message using an encryption key (E8) of an eighth key pair, generating the twelfth message comprising the encrypted first message, encrypting the twelfth message using an encryption key (E9) of a ninth key pair, generating the thirteenth message comprising the encrypted twelfth message, encrypting the thirteenth message using an encryption key (TLS-E6) of a sixth TLS key pair, and generating the encrypted thirteenth message;

transmitting the encrypted thirteenth message from the CS2 to the RD2;

at the RD2, the RD2 processing component decrypting the encrypted thirteenth message using a decryption key (TLS-D6) of the sixth TLS key pair to recover the thirteenth message, decrypting the encrypted twelfth message using a decryption key (D9) of the ninth key pair to recover the twelfth message;

at the RD2, the RD2 processing component encrypting the fourteenth message using an encryption key (E10) of a tenth key pair, generating the fifteenth message comprising the encrypted fourteenth message, encrypting the fifteenth message using an encryption key (TLS-E7) of a seventh TLS key pair, and generating the encrypted fifteenth message;

transmitting the encrypted fifteenth message from the RD2 to the UD2; and at the UD2, the EP2 processing component decrypting the encrypted fifteenth message using a decryption key (TLS-D7) of the seventh TLS key pair to recover the fifteenth message, decrypting the encrypted fourteenth message using a decryption key (D10) of the tenth key pair to recover the fourteenth message, and decrypting the encrypted first message using a decryption key (D8) of the eighth key pair to recover the first message.

4. The secure communication system according to claim 3, wherein the UD1 comprises an EP1 storage component associated with the EP1 processing component, and storing at least the encryption key (E1) of the first key pair, the encryption key (E2) of the second key pair, and the encryption key (TLS-E1) of the first TLS key pair; and
wherein the EP1 processing component is configured to retrieve the encryption keys from the EP1 storage component.

5. The secure communication system according to claim 3, wherein the UD2 comprises an EP2 storage component associated with the EP2 processing component, and storing at least the decryption key (TLS-D7) of the seventh TLS key pair, the decryption key (D8) of the eighth key pair, and the decryption key (D10) of the tenth key pair; and
wherein the EP2 processing component is configured to retrieve the decryption keys from the EP2 storage component.

6. The secure communication system according to claim 3, wherein the RD1 comprises a RD1 storage component associated with the RD1 processing component, and storing at least the encryption key (E3) of the third key pair, the encryption key (E6) of the sixth key pair, the encryption key (TLS-E2) of the second TLS key pair, the encryption key (TLS-E4) of the fourth TLS key pair, the decryption key (TLS-D1) of the first TLS key pair, the decryption key (TLS-D3) of the third TLS key pair, the decryption key (D2) of the second key pair, and the decryption key (D5) of the fifth key pair; and
wherein the RD1 processing component is configured to retrieve the encryption and decryption keys from the RD1 storage component.

7. The secure communication system according to claim 3, wherein the RD2 comprises a RD2 storage component associated with the RD2 processing component, and storing the encryption key (E7) of the seventh key pair, the encryption key (E10) of the tenth key pair, the encryption key (TLS-E5) of the fifth TLS key pair, the encryption key (TLS-E7) of the seventh TLS key pair, the decryption key (TLS-D4) of the fourth TLS key pair, the decryption key (TLS-D6) of the sixth TLS key pair, the decryption key (D6) of the sixth key pair, and the decryption key (D9) of the ninth key pair; and
wherein the RD2 processing component is configured to retrieve the encryption and decryption keys from the RD2 storage component.

8. The secure communication system according to claim 3, wherein the CS1 comprises a PCS1 storage component associated with the PCS1 processing component, and storing the encryption key (E4) of the fourth key pair, the encryption key (E5) of the fifth key pair, the encryption key (TLS-E3) of the third TLS key pair, the decryption key (TLS-D2) of the second TLS key pair, the decryption key (D1) of the first key pair, and the decryption key (D3) of the third key pair; and
wherein the PCS1 processing component is configured to retrieve the encryption and decryption keys from the PCS1 storage component.

9. The secure communication system according to claim 3, wherein the CS2 comprises a PCS2 storage component associated with the PCS2 processing component, and storing the encryption key (E8) of the eighth key pair, the encryption key (E9) of the ninth key pair, the encryption key (TLS-E6) of the sixth TLS key pair, the decryption key (TLS-D5) of the fifth TLS key pair, the decryption key (D4) of the fourth key pair, and the decryption key (D7) of the seventh key pair; and
wherein the PCS2 processing component is configured to retrieve the encryption and decryption keys from the PCS2 storage component.

10. The secure communication system according to claim 3, wherein the RD1 processing component further is configured for:
retrieving the decryption key (D2) of the second key pair based on the first RD1 pseudonym (PS1-RD1) in the third message;
retrieving the decryption key (D5) of the fifth key pair based on the second RD1 pseudonym (PS2-RD1) in the seventh message;
retrieving the decryption key (TLS-D1) of the first TLS key pair based on the first TLS pseudonym (PS1-TLS-RD1); and
retrieving the decryption key (TLS-D3) of the third TLS key pair based on the third TLS pseudonym (PS3-TLS-RD1).

11. The secure communication system according to claim 3, wherein the PCS1 processing component further is configured for:
retrieving the decryption key (D1) of the first key pair based on the second PCS1 pseudonym (PS2-PCS1) in the fourth message;

retrieving the decryption key (D3) of the third key pair based on the third PCS1 pseudonym (PS3-PCS1) in the fifth message; and retrieving the decryption key (TLS-D2) of the second TLS key pair based on the second TLS pseudonym (PS2-TLS-PCS1).

12. The secure communication system according to claim 3, wherein the RD2 processing component further is configured for:

retrieving the decryption key (D6) of the sixth key pair based on the first RD2 pseudonym (PS1-RD2) in the ninth message;

retrieving the decryption key (D9) of the ninth key pair based on the second RD2 pseudonym (PS2-RD2) in the thirteenth message;

retrieving the decryption key (TLS-D4) of the fourth TLS key pair based on the fourth TLS pseudonym (PS4-TLS-RD2); and retrieving the decryption key (TLS-D6) of the sixth TLS key pair based on the sixth TLS pseudonym (PS6-TLS-RD2).

13. The secure communication system according to claim 3, wherein the PCS2 processing component further is configured for:

retrieving the decryption key (D4) of the fourth key pair based on the third PCS2 pseudonym (PS3-PCS2) in the tenth message;

retrieving the decryption key (D7) of the seventh key pair based on the fourth PCS2 pseudonym (PS4-PCS2) in the eleventh message; and retrieving the decryption key (TLS-D5) of the fifth TLS key pair based on the fifth TLS pseudonym (PS5-TLS-PCS2).

14. The secure communication system according to claim 3, wherein the EP2 processing component further is configured for:

retrieving the decryption key (D8) of the eighth key pair based on the second EP2 pseudonym (PS2-EP2) in the fourteenth message;

retrieving the decryption key (D10) of the tenth key pair based on the third EP2 pseudonym (PS3-EP2) in the fifteenth message; and retrieving the decryption key (TLS-D7) of the seventh TLS key pair based on the seventh TLS pseudonym (PS7-TLS-EP2).

15. The secure communication system according to claim 1, wherein the EP1 processing component further is configured for:

including an alias in the first message, the alias being for use by the PCS1 processing component for selecting a routing of the first message to the CS2, and being for use by the PCS2 processing component for selecting a routing of the first message to the EP2.

16. The secure communication system according to claim 3, wherein each key pair is an asymmetric key pair.

17. The secure communication system according to claim 1, wherein the UD1, UD2, RD1, RD2, CS1 and CS2 are server devices in a client-server relationship of mutually communicating devices.

18. The secure communication system according to claim 1, wherein the UD1 and the UD2 are Applications Programing Interface (API) servers.

19. The secure communication system according to claim 1, wherein the EP1 and the EP2 are apps on the respective UD1 and UD2.

20. A secure communication method for transmission of a first message between a first user device, UD1, and a second user device, UD2, the method comprising:

at the UD1, encrypting the first message at a first level and at a second level, and encrypting the first message at a third level based on a transport layer security, TLS, protocol;

transmitting the three times encrypted first message from the UD1 to a first routing device, RD1, via secure transmission;

at the RD1, decrypting the first message at the third level based on the TLS protocol, decrypting the first message at the second level, encrypting the first message at a new second level, and encrypting the first message at a new third level based on the TLS protocol;

transmitting the three times encrypted first message from the RD1 to a first connection server, CS1, via secure transmission;

at the CS1, decrypting the first message at the third level based on the TLS protocol, decrypting the first message at the second level and at the first level, encrypting the first message at a new first level and at a new second level, and encrypting the first message at a new third level based on the TLS protocol;

transmitting the three times encrypted first message from the CS1 to the RD1 via secure transmission;

at the RD1, decrypting the first message at the third level based on the TLS protocol, decrypting the first message at the second level, encrypting the first message at a new second level, and encrypting the first message at a new third level based on the TLS protocol;

transmitting the three times encrypted first message from the RD1 to a second routing device, RD2, via secure transmission;

at the RD2, decrypting the first message at the third level based on the TLS protocol, decrypting the first message at the second level, encrypting the first message at a new second level, and encrypting the first message at a new third level based on the TLS protocol;

transmitting the three times encrypted first message from the RD2 to a second connection server, CS2, via secure transmission;

at the CS2, decrypting the first message at the third level based on the TLS protocol, decrypting the first message at the second level and at the first level, encrypting the first message at a new first level and at a new second level, and encrypting the first message at a new third level based on the TLS protocol;

transmitting the three times encrypted first message from the CS2 to the RD2 via secure transmission;

at the RD2, decrypting the first message at the third level based on the TLS protocol, decrypting the first message at the second level, encrypting the first message at a new second level, and encrypting the first message at a new third level based on the TLS protocol;

transmitting the three times encrypted first message from the RD2 to the UD2 via secure transmission; and at the UD2, decrypting the first message at the third level based on the TLS protocol, and decrypting the first message at the second level and at the first level.

21. The secure communication method according to claim 20, further comprising:

at the UD1, encrypting the first message at the first level of encryption, associating the encrypted first message with a unique first PCS1 pseudonym (PS1-PCS1) to form a second message, encrypting the second message at the second level of encryption, associating the encrypted second message with a unique first RD1 pseudonym (PS1-RD1) to form a third message, encrypting the third message at the third level of encryption, and associating the encrypted third message with a unique first TLS pseudonym (PS1-TLS-RD1) for transmission to the RD1;

transmitting the encrypted third message from the UD1 to the RD1;

at the RD1, decrypting the third level of encryption of the encrypted third message based on the first TLS pseudonym (PS1-TLS-RD1), and decrypting the second level of encryption of the encrypted second message based on the first RD1 pseudonym (PS1-RD1) as indicated by the first TLS pseudonym (PS1-TLS-RD1);

at the RD1, associating the encrypted first message with a second PCS1 pseudonym (PS2-PCS1) as indicated by the first PCS1 pseudonym (PS1-PCS1) to form a fourth message, encrypting the fourth message at the second level of encryption, associating the encrypted fourth message with a unique third PCS1 pseudonym (PS3-PCS1) to form a fifth message, encrypting the fifth message at the third level of encryption, and associating the encrypted fifth message with a unique second TLS pseudonym (PS2-TLS-CS1) for transmission to the CS1;

transmitting the encrypted fifth message from the RD1 to the CS1;

at the CS1, decrypting the third level of encryption of the encrypted fifth message based on the second TLS pseudonym (PS2-TLS-CS1), decrypting the second level of encryption of the encrypted fourth message based on the third PCS1 pseudonym (PS3-PCS1) as indicated by the second TLS pseudonym (PS2-TLS-CS1), and decrypting the first level of encryption of the encrypted first message based on the second PCS1 pseudonym (PS2-PCS1) as indicated by the third PCS1 pseudonym (PS3-PCS1);

at the CS1, encrypting the first message at the first level of encryption, associating the encrypted first message with a unique first PCS2 pseudonym (PS1-PCS2) to form a sixth message, encrypting the sixth message at the second level of encryption, associating the encrypted sixth message with a unique second RD1 pseudonym (PS2-RD1) to form a seventh message, encrypting the seventh message at the third level of encryption, and associating the encrypted seventh message with a unique third TLS pseudonym (PS3-TLS-RD1) for transmission to the RD1;

transmitting the encrypted seventh message from the CS1 to the RD1;

at the RD1, decrypting the third level of encryption of the encrypted seventh message based on the third TLS pseudonym (PS3-TLS-RD1), and decrypting the second level of encryption of the encrypted sixth message based on the second RD1 pseudonym (PS2-RD1) as indicated by the third TLS pseudonym (PS3-TLS-RD1);

at the RD1, associating the encrypted first message with a second PCS2 pseudonym (PS2-PCS2) as indicated by the first PCS2 pseudonym (PS1-PCS2) to form an eighth message, encrypting the eighth message at the second level of encryption, associating the encrypted eighth message with a unique first RD2 pseudonym (PS1-RD2) to form a ninth message, encrypting the ninth message at the third level of encryption, and associating the encrypted ninth message with a unique fourth TLS pseudonym (PS4-TLS-RD2) for transmission to the RD2;

transmitting the encrypted ninth message from the RD1 to the RD2;

at the RD2, decrypting the third level of encryption of the encrypted ninth message based on the fourth TLS pseudonym (PS4-TLS-RD2), and decrypting the second level of encryption of the encrypted eighth message based on the first RD2 pseudonym (PS1-RD2) as indicated by the fourth TLS pseudonym (PS4-TLS-RD2);

at the RD2, associating the encrypted first message with a third PCS2 pseudonym (PS3-PCS2) as indicated by the second PCS2 pseudonym (PS2-PCS2) to form a tenth message, encrypting the tenth message at the second level of encryption, associating the encrypted tenth message with a unique second PCS2 pseudonym (PS2-PCS2) to form an eleventh message, encrypting the eleventh message at the third level of encryption, and associating the encrypted eleventh message with a unique fifth TLS pseudonym (PS5-TLS-CS2) for transmission to the CS2;

transmitting the encrypted eleventh message from the RD2 to the CS2;

at the CS2, decrypting the third level of encryption of the encrypted eleventh message based on the fifth TLS pseudonym (PS5-TLS-CS2), decrypting the second level of encryption of the encrypted tenth message based on the fourth PCS2 pseudonym (PS4-PCS2) as indicated by the fifth TLS pseudonym (PS5-TLS-PCS2), and decrypting the first level of encryption of the encrypted first message based on the third PCS2 pseudonym (PS3-PCS2) as indicated by the fourth PCS2 pseudonym (PS4-PCS2);

at the CS2, encrypting the first message at the first level of encryption, associating the first message with a unique first EP2 pseudonym (PS1-EP2) to form a twelfth message, encrypting the twelfth message at the second level of encryption, associating the encrypted twelfth message with a unique second RD2 pseudonym (PS2-RD2) to form a thirteenth message, encrypting the thirteenth message at the third level of encryption, and associating the encrypted thirteenth message with a unique sixth TLS pseudonym (PS6-TLS-RD2) for transmission to the RD2;

transmitting the encrypted thirteenth message from the CS2 to the RD2;

at the RD2, decrypting the third level of encryption of the encrypted thirteenth message based on the sixth TLS pseudonym (PS6-TLS-RD2), and decrypting the second level of encryption of the encrypted twelfth message based on the second RD2 pseudonym (PS2-RD2) as indicated by the sixth TLS pseudonym (PS6-TLS-RD2);

at the RD2, associating the encrypted first message with a second EP2 pseudonym (PS2-EP2) as indicated by the first EP2 pseudonym (PS1-EP2) to form a fourteenth message, encrypting the fourteenth message at the second level of encryption, associating the encrypted fourteenth message with a unique third EP2 pseudonym (PS3-EP2) to form a fifteenth message, encrypting the fifteenth message at the third level of encryption, and associating the encrypted fifteenth message with a unique seventh TLS pseudonym (PS7-TLS-UD2) for transmission to the UD2;

transmitting the encrypted fifteenth message from the RD2 to the UD2; and at the UD2, decrypting the third level of encryption of the encrypted fifteenth message based on the seventh TLS pseudonym (PS7-TLS-UD2), decrypting the second level of encryption of the encrypted fourteenth message based on the third EP2 pseudonym (PS3-EP2) as indicated by the seventh TLS pseudonym (PS7-TLS-UD2), and decrypting the first level of encryption of the encrypted first message based on the second EP2 pseudonym (PS2-EP2) as indicated by the third EP2 pseudonym (PS3-EP2).

22. The secure communication method according to claim 21, further comprising:
- at the UD1, encrypting the first message using an encryption key (E1) of a first key pair, generating the second message comprising the encrypted first message, encrypting the second message using an encryption key (E2) of a second key pair, generating the third message comprising the encrypted second message, encrypting the third message using an encryption key (TLS-E1) of a first TLS key pair, and generating the encrypted third message;
- transmitting the encrypted third message from the UD1 to the RD1;
- at the RD1, decrypting the encrypted third message using a decryption key (TLS-D1) of the first TLS key pair to recover the third message, and decrypting the encrypted second message using a decryption key (D2) of the second key pair to recover the second message;
- at the RD1, encrypting the fourth message using an encryption key (E3) of a third key pair, generating the fifth message comprising the encrypted fourth message, encrypting the fifth message using an encryption key (TLS-E2) of a second TLS key pair, and generating the encrypted fifth message;
- transmitting the encrypted fifth message from the RD1 to the CS1;
- at the CS1, decrypting the encrypted fifth message using a decryption key (TLS-D2) of the second TLS key pair to recover the fifth message, decrypting the encrypted fourth message using a decryption key (D3) of the third key pair to recover the fourth message, and decrypting the encrypted first message using a decryption key (D1) of the first key pair to recover the first message;
- at the CS1, encrypting the first message using an encryption key (E4) of a fourth key pair, generating the sixth message comprising the once again encrypted first message, encrypting the sixth message using an encryption key (E5) of a fifth key pair, generating the seventh message comprising the encrypted sixth message, encrypting the seventh message using an encryption key (TLS-E3) of a third TLS key pair, and generating the encrypted seventh message;
- transmitting the encrypted seventh message from the CS1 to the RD1;
- at the RD1, decrypting the encrypted seventh message using a decryption key (TLS-D3) of the third TLS key pair to recover the seventh message, and decrypting the encrypted sixth message using a decryption key (D5) of the fifth key pair to recover the sixth message;
- at the RD1, encrypting the eighth message using an encryption key (E6) of a sixth key pair, generating the ninth message comprising the encrypted eighth message, encrypting the ninth message using an encryption key (TLS-E4) of a fourth TLS key pair, and generating the encrypted ninth message;
- transmitting the encrypted ninth message from the RD1 to the RD2;
- at the RD2, decrypting the encrypted ninth message using a decryption key (TLS-D4) of the fourth TLS key pair to recover the ninth message, and decrypting the encrypted eighth message using a decryption key (D6) of the sixth key pair to recover the eighth message;
- at the RD2, encrypting the tenth message using an encryption key (E7) of a seventh key pair, generating the eleventh message comprising the encrypted tenth message, encrypting the eleventh message using an encryption key (TLS-E5) of a fifth TLS key pair, and generating the encrypted eleventh message;
- transmitting the encrypted eleventh message from the RD2 to the CS2;
- at the CS2, decrypting the encrypted eleventh message using a decryption key (TLS-D5) of the fifth TLS key pair to recover the eleventh message, decrypting the encrypted tenth message using a decryption key (D7) of the seventh key pair to recover the tenth message, and decrypting the encrypted first message using a decryption key (D4) of the fourth key pair to recover the first message;
- at the CS2, encrypting the first message using an encryption key (E8) of an eighth key pair, generating the twelfth message comprising the encrypted first message, encrypting the twelfth message using an encryption key (E9) of a ninth key pair, generating the thirteenth message comprising the encrypted twelfth message, encrypting the thirteenth message using an encryption key (TLS-E6) of a sixth TLS key pair, and generating the encrypted thirteenth message;
- transmitting the encrypted thirteenth message from the CS2 to the RD2;
- at the RD2, decrypting the encrypted thirteenth message using a decryption key (TLS-D6) of the sixth TLS key pair to recover the thirteenth message, decrypting the encrypted twelfth message using a decryption key (D9) of the ninth key pair to recover the twelfth message;
- at the RD2, encrypting the fourteenth message using an encryption key (E10) of a tenth key pair, generating the fifteenth message comprising the encrypted fourteenth message, encrypting the fifteenth message using an encryption key (TLS-E7) of a seventh TLS key pair, and generating the encrypted fifteenth message;
- transmitting the encrypted fifteenth message from the RD2 to the UD2; and
- at the UD2, decrypting the encrypted fifteenth message using a decryption key (TLS-D7) of the seventh TLS key pair to recover the fifteenth message, decrypting the encrypted fourteenth message using a decryption key (D10) of the tenth key pair to recover the fourteenth message, and decrypting the encrypted first message using a decryption key (D8) of the eighth key pair to recover the first message.

* * * * *